(12) United States Patent
Shankar et al.

(10) Patent No.: US 11,403,616 B2
(45) Date of Patent: *Aug. 2, 2022

(54) WIRELESS CLIENT TRANSACTION SYSTEMS AND RELATED METHODS

(71) Applicant: Green Dot Corporation, Austin, TX (US)

(72) Inventors: Pravin Shankar, Santa Clara, CA (US); Steven William Streit, Pasadena, CA (US); Samuel Harris Altman, San Francisco, CA (US)

(73) Assignee: Green Dot Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/920,262

(22) Filed: Jul. 2, 2020

(65) Prior Publication Data

US 2020/0394642 A1 Dec. 17, 2020

Related U.S. Application Data

(63) Continuation of application No. 15/921,261, filed on Mar. 14, 2018, now Pat. No. 10,706,405, which is a continuation of application No. 13/931,183, filed on Jun. 28, 2013, now Pat. No. 9,947,004.

(60) Provisional application No. 61/665,853, filed on Jun. 28, 2012.

(51) Int. Cl.
| | |
|---|---|
| *G06Q 20/32* | (2012.01) |
| *H04L 9/40* | (2022.01) |
| *H04W 4/021* | (2018.01) |
| *H04W 8/00* | (2009.01) |
| *G01S 5/02* | (2010.01) |
| *H04W 12/06* | (2021.01) |

(52) U.S. Cl.
CPC ............ *G06Q 20/3224* (2013.01); *G01S 5/02* (2013.01); *H04L 63/107* (2013.01); *H04W 4/021* (2013.01); *H04W 8/005* (2013.01); *H04W 12/068* (2021.01); *H04L 63/083* (2013.01); *H04W 12/06* (2013.01)

(58) Field of Classification Search
CPC .......... G06Q 20/3224; H04W 12/068; H04W 8/005; H04W 4/021; H04W 12/06; G01S 5/02; H04L 63/107; H04L 63/083
USPC ......................................................... 705/18
See application file for complete search history.

(56) References Cited

U.S. PATENT DOCUMENTS

| | | |
|---|---|---|
| D42,210 S | 2/1912 | Hoch |
| 4,804,984 A | 2/1989 | Heuer et al. |
| 4,939,662 A | 7/1990 | Nimura et al. |
| 5,086,394 A | 2/1992 | Shapira |

(Continued)

FOREIGN PATENT DOCUMENTS

| | | |
|---|---|---|
| EP | 1295500 B1 | 5/2009 |
| WO | 2001060100 | 8/2001 |

OTHER PUBLICATIONS

International Search Report and Written Opinion for International Application No. PCT/IB2008/02235, Search Completed Apr. 23, 2009, dated May 28, 2009.

(Continued)

*Primary Examiner* — Garcia Ade
(74) *Attorney, Agent, or Firm* — KPPB LLP

(57) ABSTRACT

Embodiments of wireless client transaction systems are described herein. Other embodiments and related methods are also disclosed herein.

16 Claims, 13 Drawing Sheets

(56) References Cited

U.S. PATENT DOCUMENTS

| | | | |
|---|---|---|---|
| 5,320,409 A | 6/1994 | Katoh et al. |
| 5,740,915 A | 4/1998 | Williams |
| 5,754,939 A | 5/1998 | Herz et al. |
| 5,758,313 A | 5/1998 | Shah et al. |
| 5,760,381 A | 6/1998 | Stich et al. |
| 5,777,305 A | 7/1998 | Smith et al. |
| 5,842,629 A | 12/1998 | Sprague et al. |
| 5,918,909 A | 7/1999 | Fiala et al. |
| 5,975,302 A | 11/1999 | Young |
| 5,984,091 A | 11/1999 | Orr et al. |
| 6,014,090 A | 1/2000 | Rosen et al. |
| 6,049,711 A | 4/2000 | Ben-Yehezkel et al. |
| 6,052,122 A | 4/2000 | Sutcliffe et al. |
| 6,061,681 A | 5/2000 | Collins et al. |
| 6,109,439 A | 8/2000 | Goade, Sr. |
| 6,112,186 A | 8/2000 | Bergh et al. |
| 6,185,545 B1 | 2/2001 | Resnick et al. |
| 6,208,934 B1 | 3/2001 | Bechtolsheim et al. |
| 6,224,108 B1 | 5/2001 | Klure |
| 6,272,467 B1 | 8/2001 | Durand et al. |
| 6,315,206 B1 | 11/2001 | Hansen et al. |
| 6,317,718 B1 | 11/2001 | Fano |
| 6,349,829 B1 | 2/2002 | Matheis et al. |
| 6,366,568 B1 | 4/2002 | Bolgiano et al. |
| 6,456,854 B1 | 9/2002 | Chern et al. |
| 6,457,649 B1 | 10/2002 | Hileman |
| 6,529,136 B2 | 3/2003 | Cao et al. |
| 6,529,143 B2 | 3/2003 | Mikkola et al. |
| 6,539,232 B2 | 3/2003 | Hendrey |
| 6,549,768 B1 | 4/2003 | Fraccaroli |
| 6,618,593 B1 | 9/2003 | Drutman et al. |
| 6,639,905 B1 | 10/2003 | Müller et al. |
| 6,687,608 B2 | 2/2004 | Sugimoto et al. |
| 6,732,459 B1 | 5/2004 | Clark |
| 6,819,919 B1 | 11/2004 | Tanaka |
| 6,925,441 B1 | 8/2005 | Jones, III et al. |
| 6,957,737 B1 | 10/2005 | Frederickson et al. |
| 6,965,868 B1 | 11/2005 | Bednarek |
| D512,456 S | 12/2005 | Diaz |
| 7,039,423 B2 | 5/2006 | Daniel et al. |
| 7,047,030 B2 | 5/2006 | Forsyth |
| 7,071,842 B1 | 7/2006 | Brady, Jr. |
| 7,082,365 B2 | 7/2006 | Sheha et al. |
| 7,111,323 B1 | 9/2006 | Bhatia et al. |
| D532,452 S | 11/2006 | Heng |
| 7,203,502 B2 | 4/2007 | Wilson et al. |
| 7,203,674 B2 | 4/2007 | Cohen |
| 7,236,799 B2 | 6/2007 | Wilson et al. |
| 7,256,711 B2 | 8/2007 | Sheha et al. |
| 7,271,742 B2 | 9/2007 | Sheha et al. |
| 7,333,820 B2 | 2/2008 | Sheha et al. |
| 7,363,027 B2 | 4/2008 | Hon et al. |
| 7,392,935 B2 | 7/2008 | Byrne |
| 7,486,958 B2 | 2/2009 | Sheha et al. |
| 7,494,056 B2 | 2/2009 | Sturm |
| 7,565,155 B2 | 7/2009 | Sheha et al. |
| 7,593,740 B2 | 9/2009 | Crowley et al. |
| 7,634,354 B2 | 12/2009 | Salmre |
| 7,813,741 B2 | 10/2010 | Hendrey et al. |
| 7,840,224 B2 | 11/2010 | Vengroff et al. |
| 7,877,082 B2 | 1/2011 | Eagle et al. |
| 7,917,154 B2 | 3/2011 | Fortescue et al. |
| 7,978,900 B2 | 7/2011 | Nepomniachtchi et al. |
| 8,000,726 B2 | 8/2011 | Altman et al. |
| 8,023,963 B2 | 9/2011 | Yonker et al. |
| 8,086,530 B2 | 12/2011 | Resnick et al. |
| 8,099,109 B2 | 1/2012 | Altman et al. |
| 8,181,789 B1 | 5/2012 | Kohler et al. |
| 8,234,214 B2 | 7/2012 | Templeton et al. |
| 8,275,699 B2 | 9/2012 | Shader et al. |
| 8,352,367 B2 | 1/2013 | Templeton et al. |
| 8,427,942 B2 * | 4/2013 | Kim ............... H04W 48/16 |
| | | 455/452.2 |
| 8,660,943 B1 | 2/2014 | Chirehdast |
| 8,768,838 B1 | 7/2014 | Hoffman |
| 8,977,568 B1 | 3/2015 | Schattauer et al. |
| 8,989,778 B2 | 3/2015 | Pernikoff et al. |
| 9,947,004 B2 | 4/2018 | Shankar et al. |
| 10,706,405 B2 | 7/2020 | Shankar et al. |
| 10,937,088 B2 | 3/2021 | Streit et al. |
| 2001/0001321 A1 | 5/2001 | Resnick et al. |
| 2002/0052786 A1 | 5/2002 | Kim et al. |
| 2002/0077745 A1 | 6/2002 | Ohmura et al. |
| 2003/0016804 A1 | 1/2003 | Sheha et al. |
| 2003/0036848 A1 | 2/2003 | Sheha et al. |
| 2003/0055983 A1 | 3/2003 | Callegari |
| 2003/0060214 A1 | 3/2003 | Hendrey et al. |
| 2003/0061211 A1 | 3/2003 | Shultz et al. |
| 2003/0064705 A1 | 4/2003 | Desiderio |
| 2003/0078035 A1 | 4/2003 | Sheha et al. |
| 2003/0149527 A1 | 8/2003 | Sikila |
| 2003/0150762 A1 | 8/2003 | Biller |
| 2004/0030647 A1 | 2/2004 | Hansen |
| 2004/0054428 A1 | 3/2004 | Sheha et al. |
| 2004/0224703 A1 | 11/2004 | Takaki et al. |
| 2005/0021560 A1 | 1/2005 | Yoon et al. |
| 2005/0027543 A1 * | 2/2005 | Labrou ............... G06Q 50/188 |
| | | 705/26.35 |
| 2005/0032527 A1 | 2/2005 | Sheha et al. |
| 2005/0043060 A1 | 2/2005 | Brandenberg et al. |
| 2005/0044409 A1 | 2/2005 | Betz et al. |
| 2005/0054352 A1 | 3/2005 | Karaizman |
| 2005/0073443 A1 | 4/2005 | Sheha et al. |
| 2005/0075119 A1 | 4/2005 | Sheha et al. |
| 2005/0101300 A1 | 5/2005 | Hon et al. |
| 2005/0114527 A1 | 5/2005 | Hankey |
| 2005/0159996 A1 | 7/2005 | Lazarus |
| 2005/0166058 A1 | 7/2005 | Brokenshire et al. |
| 2005/0171898 A1 | 8/2005 | Bishop et al. |
| 2005/0197954 A1 | 9/2005 | Maitland et al. |
| 2005/0216337 A1 | 9/2005 | Roberts et al. |
| 2005/0250552 A1 | 11/2005 | Eagle |
| 2005/0268254 A1 | 12/2005 | Abramson et al. |
| 2005/0283620 A1 | 12/2005 | Khulusi et al. |
| 2005/0289340 A1 | 12/2005 | Camenisch |
| 2006/0027663 A1 | 2/2006 | Tang |
| 2006/0036364 A1 | 2/2006 | Matsuo et al. |
| 2006/0047825 A1 | 3/2006 | Steenstra et al. |
| 2006/0064346 A1 | 3/2006 | Steenstra et al. |
| 2006/0085443 A1 | 4/2006 | Pae |
| 2006/0089160 A1 | 4/2006 | Othmer |
| 2006/0186011 A1 | 8/2006 | Palmer |
| 2006/0223518 A1 | 10/2006 | Haney |
| 2006/0255154 A1 | 11/2006 | Newbrough et al. |
| 2006/0270419 A1 | 11/2006 | Crowley et al. |
| 2006/0278551 A1 | 12/2006 | Bianchini et al. |
| 2007/0050129 A1 | 3/2007 | Salmre |
| 2007/0112614 A1 | 5/2007 | Maga et al. |
| 2007/0150414 A1 | 6/2007 | Templeton et al. |
| 2007/0252009 A1 | 11/2007 | Kingsborough et al. |
| 2007/0253712 A1 * | 11/2007 | Katagiri ............... H04J 14/0227 |
| | | 398/59 |
| 2007/0278293 A1 | 12/2007 | Anderson et al. |
| 2007/0281689 A1 | 12/2007 | Altman et al. |
| 2007/0281690 A1 | 12/2007 | Altman et al. |
| 2008/0022382 A1 | 1/2008 | Bradbury et al. |
| 2008/0052182 A1 | 2/2008 | Marshall et al. |
| 2008/0082424 A1 | 4/2008 | Walton |
| 2008/0086414 A1 | 4/2008 | Ching |
| 2008/0091535 A1 | 4/2008 | Heiser |
| 2008/0103959 A1 | 5/2008 | Carroll et al. |
| 2008/0109358 A1 | 5/2008 | Kottmeier et al. |
| 2008/0132252 A1 | 6/2008 | Altman et al. |
| 2008/0133322 A1 | 6/2008 | Kalia et al. |
| 2008/0133336 A1 | 6/2008 | Altman et al. |
| 2008/0188246 A1 | 8/2008 | Sheha et al. |
| 2008/0195536 A1 | 8/2008 | Karns et al. |
| 2008/0208697 A1 | 8/2008 | Kargman |
| 2008/0227473 A1 | 9/2008 | Haney |
| 2008/0237317 A1 | 10/2008 | Rosendall |
| 2008/0270802 A1 | 10/2008 | Ashley |
| 2009/0063286 A1 | 3/2009 | Rodriguez Porras |
| 2009/0081989 A1 | 3/2009 | Wuhrer |
| 2009/0090783 A1 | 4/2009 | Killian et al. |

(56) References Cited

U.S. PATENT DOCUMENTS

| | | |
|---|---|---|
| 2009/0164366 A1 | 6/2009 | Blythe et al. |
| 2009/0177375 A1 | 7/2009 | Jung et al. |
| 2009/0254413 A1 | 10/2009 | Chang |
| 2009/0298481 A1 | 12/2009 | Hurst |
| 2010/0036770 A1 | 2/2010 | Fourez et al. |
| 2010/0106568 A1 | 4/2010 | Grimes |
| 2010/0106569 A1 | 4/2010 | Grimes |
| 2010/0106577 A1 | 4/2010 | Grimes |
| 2010/0106596 A1 | 4/2010 | Grimes |
| 2010/0106598 A1* | 4/2010 | Grimes ............. G06Q 30/0269 705/14.53 |
| 2010/0211499 A1 | 8/2010 | Zanzot et al. |
| 2010/0240352 A1* | 9/2010 | Suri ..................... H04W 4/029 455/419 |
| 2010/0306089 A1 | 12/2010 | Gelerman et al. |
| 2010/0318489 A1 | 12/2010 | De Barros et al. |
| 2011/0016048 A1 | 1/2011 | Lindqvist et al. |
| 2011/0029434 A1 | 2/2011 | Templeton et al. |
| 2011/0035284 A1 | 2/2011 | Moshfeghi |
| 2011/0047619 A1 | 2/2011 | King et al. |
| 2011/0051665 A1 | 3/2011 | Huang |
| 2011/0099082 A1 | 4/2011 | Walker et al. |
| 2011/0184840 A1 | 7/2011 | Godard et al. |
| 2011/0208550 A1 | 8/2011 | Lamarche et al. |
| 2011/0208612 A1 | 8/2011 | Shader et al. |
| 2011/0208641 A1 | 8/2011 | Shader et al. |
| 2011/0208642 A1 | 8/2011 | Shader et al. |
| 2011/0208643 A1 | 8/2011 | Shader et al. |
| 2011/0208649 A1 | 8/2011 | Shader et al. |
| 2011/0225063 A1 | 9/2011 | Grunski et al. |
| 2011/0251892 A1 | 10/2011 | Laracey |
| 2011/0258122 A1 | 10/2011 | Shader |
| 2011/0270661 A1 | 11/2011 | Heiser, II et al. |
| 2011/0270756 A1 | 11/2011 | Tullis et al. |
| 2011/0275388 A1 | 11/2011 | Haney |
| 2011/0276374 A1 | 11/2011 | Heiser, II et al. |
| 2011/0276474 A1 | 11/2011 | Portillo |
| 2011/0313926 A1 | 12/2011 | Templeton et al. |
| 2012/0005085 A1 | 1/2012 | Pitroda |
| 2012/0022971 A1 | 1/2012 | Morris |
| 2012/0066081 A1 | 3/2012 | Shader |
| 2012/0095909 A1 | 4/2012 | Resnick et al. |
| 2012/0136789 A1 | 5/2012 | Kendrick et al. |
| 2012/0136790 A1 | 5/2012 | Templeton et al. |
| 2012/0150605 A1 | 6/2012 | Isaacson et al. |
| 2012/0233069 A1 | 9/2012 | Bulawa et al. |
| 2012/0246019 A1 | 9/2012 | Wolfe |
| 2012/0292206 A1 | 11/2012 | Casella et al. |
| 2012/0296813 A1 | 11/2012 | Templeton et al. |
| 2012/0296814 A1 | 11/2012 | Templeton et al. |
| 2012/0310833 A1 | 12/2012 | Templeton et al. |
| 2013/0006785 A1 | 1/2013 | Perkins |
| 2013/0041729 A1 | 2/2013 | Shader |
| 2013/0041741 A1 | 2/2013 | Shader |
| 2013/0073403 A1 | 3/2013 | Tuchman et al. |
| 2013/0144734 A1 | 6/2013 | Perkins |
| 2013/0144789 A1 | 6/2013 | Aaltonen et al. |
| 2013/0204925 A1 | 8/2013 | McDougall et al. |
| 2013/0291127 A1 | 10/2013 | Bergman et al. |
| 2013/0317923 A1 | 11/2013 | Capps |
| 2014/0006191 A1 | 1/2014 | Shankar et al. |
| 2014/0012648 A1 | 1/2014 | Grimes |
| 2014/0012690 A1 | 1/2014 | Capps |
| 2014/0019322 A1 | 1/2014 | Streit et al. |
| 2014/0058837 A1 | 2/2014 | Grimes |
| 2014/0115710 A1 | 4/2014 | Hughes |
| 2014/0122684 A1 | 5/2014 | Brentano |
| 2014/0180819 A1 | 6/2014 | Grimes |
| 2014/0316988 A1 | 10/2014 | Nosek et al. |
| 2015/0081565 A1 | 3/2015 | Roullier et al. |
| 2015/0101062 A1 | 4/2015 | Silver et al. |
| 2015/0142655 A1 | 5/2015 | Ghosh et al. |
| 2015/0180736 A1 | 6/2015 | Leung |
| 2015/0193873 A1 | 7/2015 | Hammock et al. |
| 2015/0199725 A1 | 7/2015 | Aaltonen et al. |
| 2015/0206137 A1 | 7/2015 | Mazarim et al. |
| 2016/0071083 A1 | 3/2016 | Apps |
| 2016/0189213 A1 | 6/2016 | Gopalan et al. |
| 2016/0189229 A1 | 6/2016 | Gopalan et al. |
| 2016/0189230 A1 | 6/2016 | Gopalan et al. |
| 2016/0189292 A1 | 6/2016 | Deshpande et al. |
| 2016/0342967 A1 | 11/2016 | Proctor et al. |
| 2016/0379211 A1 | 12/2016 | Hoyos et al. |
| 2017/0024731 A1 | 1/2017 | Gullett et al. |
| 2017/0039551 A1 | 2/2017 | Driggs et al. |
| 2017/0053276 A1 | 2/2017 | Gullett et al. |
| 2017/0097996 A1 | 4/2017 | Gullett et al. |
| 2018/0268396 A1 | 9/2018 | Shankar et al. |
| 2018/0308157 A1* | 10/2018 | Streit .................... G06Q 40/02 |
| 2018/0315028 A1 | 11/2018 | Gullett et al. |
| 2019/0095989 A1 | 3/2019 | Archer et al. |

OTHER PUBLICATIONS

International Search Report and Written Opinion for International Application No. PCT/US2007/012960, Search Completed Dec. 13, 2007, dated Jan. 3, 2008.

International Search Report and Written Opinion for International Application No. PCT/US2009/049956, Search Completed Aug. 24, 2009, dated Sep. 1, 2009.

Altman, Samuel H., "Viendo: A Mobile Entertainment Management Service," BASES Business Plan Compeition/Symposium, Apr. 9, 2005.

Bahl, P. et.al., "Radar: An In-Building RF-based User Location and Tracking System," Proceedings of IEEE INFOCOM 2000, vol. 2, Tel-Aviv, Israel, Mar. 2000, 775-784.

Chintalapudi, Krishna K., "Indoor Localization Without the Pain, in Mobicom," Association for Computing Machinery, Inc., Sep. 2010.

Eriksson, Jakob et.al., "Cabernet: Vehicular Content Delivery Using WiFi.," MIT CSAIL MOBICOM 2008.

Fiercewireless, "Sprint offers Loopt's social mapping service," Published online Jul. 17, 2007,Retrieved from Internet at http://fiercewireless.com/story/sprint-offers-loopts-social-mapping-service/ 7/17/07 on Mar. 8, 2009.

Non-Final Office Action in U.S. Appl. No. 11/445,727, dated Jul. 25, 2008.

Non-Final Office Action in U.S. Appl. No. 11/445,729, dated Jun. 9, 2008.

Non-Final Office Action in U.S. Appl. No. 11/445,751, dated Jul. 10, 2008.

Ji, Y. et.al., "ARIADNE: A Dynamic Indoor Signal Map Construction and Localization System," In MobiSys, 2006.

Karouia et al., , "Video Similarity Measurement Based on Attributed Relational Graph Matching," N.T. Nguyen, R. Katarzyniak (Eds.): New Challenges in Applied Intelligence Technologies, SCI 134, pp. 173-182, 2008, 10 Pages.

LAT49, Screen capture of http://lat49.com/howitworks/index.php, Jun. 12, 2009.

Liu, Jennifer , "BASES business competition awards $2,000," The Daily Stanford Online Edition, [Online] Apr. 11, 2005, Retrieved from Internet at http://www.stanforddaily.com/cgi-bin/?p=1017453, Oct. 26, 2009.

Loopt, "About Loopt," Internet Article, [Online] Dec. 14, 2004, Retrieved from Internet at http://www.loopt.com/ about, Mar. 8, 2009.

Madigan et al., "Bayesian Indoor Positioning Systems," In Infocom, 2005.

Matt Duckham & Lars Kulik, "Location Privacy and Location-aware computing," 2005.

Mobilaris, , "Find Your Buddy is a Social Networking application," Internet Article, (Online) Jun. 7, 2007 Retrieved from Internet at http://mobilaris.gotlandica.se/virtupload/contenU27/Find_Y our_Buddy.pdf, Mar. 8, 2009.

Mobilaris, "Pacific Ocean extends technology lead by integrating MapInfo miAware?," LBS Platform Internet Article, [Online] Feb. 6, 2003, Retrieved from Internet at http://nweb.waymaker.se/bitonline/ 2003/02/06/20030205BIT00440/wkr0002.pdf, Mar. 8, 2009.

(56) References Cited

OTHER PUBLICATIONS

Non-Final Office Action in U.S. Appl. No. 11/445,730, dated Apr. 29, 2009.
Non-Final Office Action in U.S. Appl. No. 11/881,836, dated Jul. 23, 2009.
Schreiner, Keri, "Where We At? Mobile Phones Bring GPS to the Masses," IEEE Computer Graphics and Applications vol. 27, No. 3, May 2007-Jun. 2007, pp. 6-11.
secretadmirer.com, Screen capture using http://web.archive.org of http://secretAdmirer.com website, Dec. 2, 1998.
Youssef, M. et.al., "The Horus WLAN Location Determination System," In MobiSys, 2005.
"Method for Avoiding and Repairing Damage to Distributed Transactions in a Coordinated Resource Recovery System," IBM Technical Disclosure Bulletin, 1991, vol. 33, Issue 10A, pp. 362-366.

\* cited by examiner

| CLIENT ID | NAME | CLIENT DEVICE TYPE | PAYMENT INFO | PASSWORD |
|---|---|---|---|---|
| xxxxxxx1 | USER-1 | APPLE iPHONE 5 | AMEX xxxx | ~~ |
| xxxxxxx6 | USER-2 | ~~ | PAYPAL xxxx | ~~ |
| xxxxxxx5 | USER-3 | ~~ | VISA xxxx | ~~ |
| ~~ | ~~ | ~~ | ~~ | ~~ |

FIG. 5

Point of Sale Terminal

| | |
|---|---|
| Gillette Fusion, 4pk | $22.00 |
| Ritz Crackers, 48 oz. | $4.95 |
| Snapple Iced Tea, 10oz | $1.95 |
| | |
| Subtotal | $28.90 |
| Tax (8.25%) | $2.38 |
| Total | $31.28 |

*Payment Options*

Welcome User-1 — 6511
Pay By Phone

Welcome User-2 — 8511
Pay By Phone

PAY BY CREDIT CARD
PAY BY DEBIT CARD
PAY BY CASH

| Vector | Location | Reference Device Type | Bitrate | Frequency Channel | Packet Size | RSS |
|---|---|---|---|---|---|---|
| 1A | 1910 | iPhone 5 | BR-1 | FC-1 | PS-1 | ～ |
| 2A | 1910 | iPhone 5 | BR-1 | FC-1 | PS-2 | ～ |
| 3A | 1910 | iPhone 5 | BR-1 | FC-2 | PS-1 | ～ |
| 4A | 1910 | iPhone 5 | BR-1 | FC-2 | PS-2 | ～ |
| 5A | 1910 | iPhone 5 | BR-2 | FC-1 | PS-1 | ～ |
| 6A | 1910 | iPhone 5 | BR-2 | FC-1 | PS-2 | ～ |
| 7A | 1910 | iPhone 5 | BR-2 | FC-2 | PS-1 | ～ |
| 8A | 1910 | iPhone 5 | BR-2 | FC-2 | PS-2 | ～ |
| 1B | 1920 | iPhone 5 | BR-1 | FC-1 | PS-1 | ～ |
| 2B | 1920 | iPhone 5 | BR-1 | FC-1 | PS-2 | ～ |
| 3B | 1920 | iPhone 5 | BR-1 | FC-2 | PS-1 | ～ |
| 4B | 1920 | iPhone 5 | BR-1 | FC-2 | PS-2 | ～ |
| 5B | 1920 | iPhone 5 | BR-2 | FC-1 | PS-1 | ～ |
| 6B | 1920 | iPhone 5 | BR-2 | FC-1 | PS-2 | ～ |
| 7B | 1920 | iPhone 5 | BR-2 | FC-2 | PS-1 | ～ |
| 8B | 1920 | iPhone 5 | BR-2 | FC-2 | PS-2 | ～ |
| 1C | 1930 | iPhone 5 | BR-1 | FC-1 | PS-1 | ～ |
| 2C | 1930 | iPhone 5 | BR-1 | FC-1 | PS-2 | ～ |
| ... | | | | | | ... |

FIG. 11

METHOD 13000

13100 — generating, with a training module, a first signal strength chart of a portion of the business locale for a first reference device type

13200 — scanning, via a scanning module, a wireless channel set at a business locale for wireless signals of a registered customer set

13300 — identifying via the scanning module, out of the wireless signals, first wireless packets of a first client of the registered customer set

13400 — calculating, via the scanning module, a first client signal strength of the first wireless packets

13500 — calculating, via a localization module, whether the first client is at a transaction area of the business locale based on the first client signal strength

13600 — presenting a user interface to a user at the transaction area via a POS module, the user interface comprising a first payment option correlated to the first client when the localization module calculates that the first client is at the transaction area

FIG. 13

WIRELESS CLIENT TRANSACTION SYSTEMS AND RELATED METHODS

CROSS-REFERENCE TO RELATED APPLICATIONS

The current application is a continuation of U.S. patent application Ser. No. 15/921,261, filed Mar. 14, 2018, which application is a continuation of U.S. patent application Ser. No. 13/931,183, filed Jun. 28, 2013, which application claims priority to U.S. Provisional Patent Application No. 61/665,853, filed Jun. 28, 2012, the disclosures of which are incorporated herein by reference in their entireties.

FIELD OF THE INVENTION

This invention relates generally to wireless identification technologies, and relates, more particularly, to wireless client transaction systems and related methods.

BACKGROUND

For the past several decades, credit cards have been the most popular form of payment at retail stores. Recently there has been a push by several credit card service providers, cellular service providers and software companies towards Near Field Communication (NFC) as an improved alternate to credit cards. NFC devices are purported to be more secure and more convenient to use, but most mobile phones today do not include NFC hardware, which adds cost and complexity to the design of mobile devices, and which has therefore not become ubiquitous in the market. Accordingly, NFC-based systems are constrained due to the lack of supported hardware in use by clients.

Therefore, a need exists in the art to develop mobile client identification systems and related methods that address such limitations of the current technology without imposing additional inconvenience or hardware upgrade costs to clients or consumers

BRIEF DESCRIPTION OF THE DRAWINGS

The invention will be better understood from a reading of the following detailed description of examples of embodiments, taken in conjunction with the accompanying figures in the drawings in which:

FIG. 5 illustrates exemplary information contained by a registered customer set stored in a database of the transaction system of FIG. 1.

FIG. 9 illustrates a screen of the user interface of the point of service module of the transaction system, presenting both the first transaction option correlated to the first user and the second transaction option correlated to the second user for situations where both the first and second users are detected to be at a transaction area of the business locale proximate the point of service module.

FIG. 11 illustrates the RSS chart in map format, with respect to which one or more wireless clients can be localized by the transaction system at the business locale.

FIG. 13 illustrates a flowchart for a method of transacting with wireless clients via the transaction system.

Figure 1:
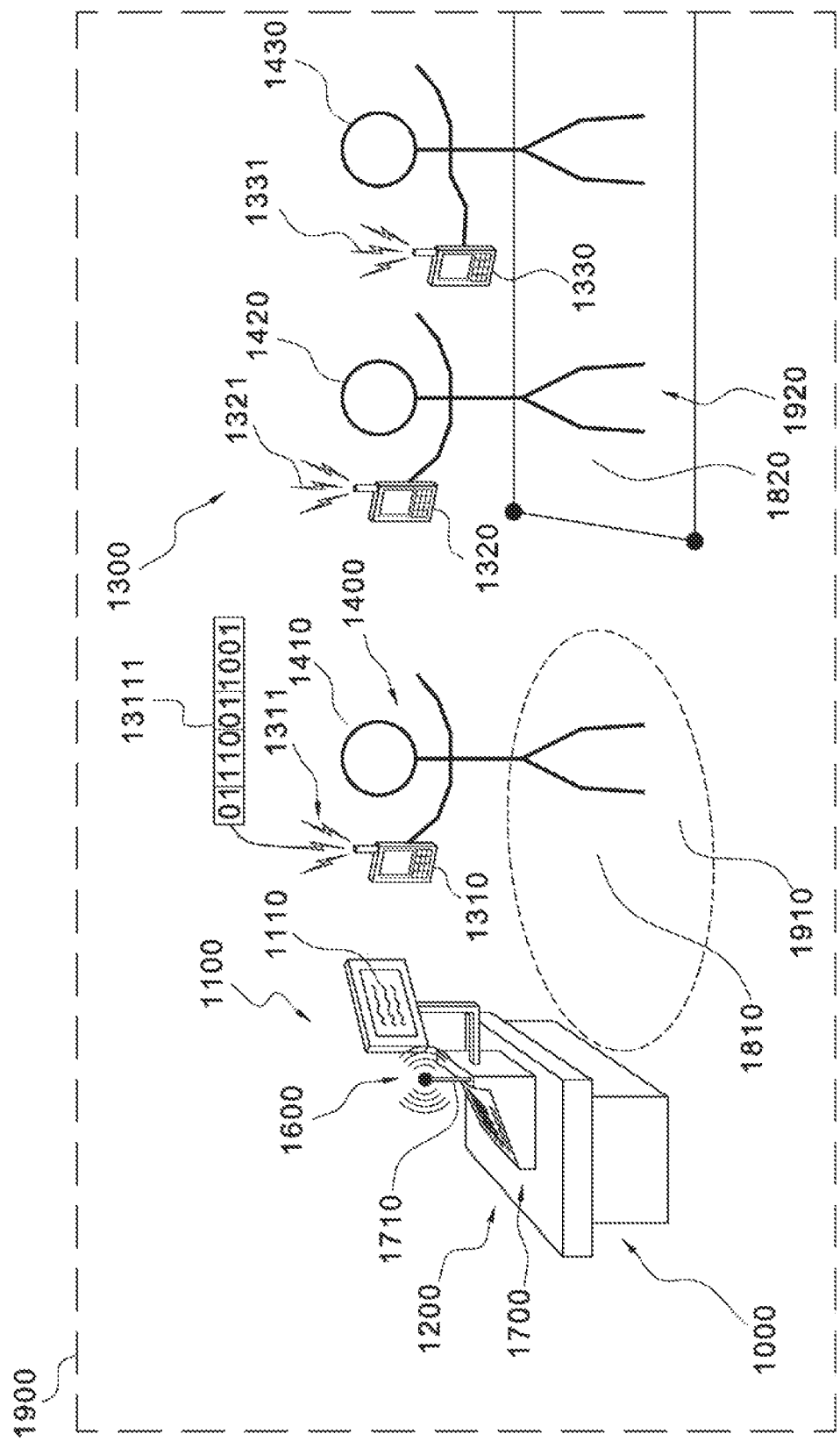
FIG. 1 illustrates a high-level overview of a transaction system for wireless clients, shown in the context of a business locale.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types. The absence of the word "removably," "removable," and the like near the word "coupled." and the like does not mean that the coupling, etc. in question is or is not removable.

SUMMARY

Credit cards and NFC devices cover two ends of the payments spectrum. There is a middle ground that has not been explored much to date. The present disclosure explores this middle ground, allowing mobile phones to be used for contactless payments at retail stores, without requiring them to be equipped with NFC hardware. The proposed approach leverages existing radio on mobile phones, including WiFi (IEEE 802.11a/b/g/n) WiPAN (IEEE 802.15) such as Bluetooth®, and/or cellular data (W-CDMA, HSPA, EDGE, WiMAX, LTE, etc.). Almost all phones today are equipped with one or more of these radio technologies, and by fingerprinting the radio signal profile passively via access points at a Point of Service (POS), it is possible to passively localize the mobile phone without imposing an additional hardware or software requirements. The systems and methods described herein permit a POS module to know when the client's mobile phone is close to it and ready for a transaction, such as a payment transaction, without requiring specialized NFC hardware technology.

The present disclosure describes wireless client transaction systems and methods for identifying users at transaction areas within a business locale, using passive radio fingerprinting of the users' respective wireless clients. As used herein, the term wireless client can refer to personal wireless mobile devices comprising, for example, cellular phones, smartphones, and/or tablet devices. Such transaction systems may be implemented via dedicated hardware and/or via software running on devices such as wireless access points, laptops, PCs, tablets, phones, or a combination of hardware and software on multiple devices and radios. In some examples, communication for the systems and methods herein can be implemented via WiFi (IEEE 802.11). In the same or other examples, other wireless technologies can be used, as described above.

A high-level overview of transaction system 1000 is shown in FIG. 1, in the context of business locale 1900, where at least part of transaction system 1000 is located at or proximate to transactional area 1910 of business locale 1900. Transaction system 1000 relies on radio 1710 (WiFi, WiPAN, cellular, etc.) to passively scan for wireless packets of wireless clients 1300. Upon finding such wireless packets, transaction system 1000 checks if they come from wireless client(s) 1300 of registered user(s) of wireless transaction system 1000. Such assessment can be made, for example, based on the hardware address (MAC addresses, device unique identifiers, etc.) of the wireless client(s) 1300 of the users. Transaction system 1000 can then determine, based on the signal strength of received wireless packets of wireless client(s) 1300, if the registered user of wireless client 1310 is within transaction area 1910 and/or proximate to POS module 1100. Upon detecting such a situation, transaction system 1000 can identify and/or greet the user of wireless client 1310 with a transaction option correlated to wireless client 1310, such as a transaction option for the user to pay via wireless client 1310.

In some examples, when the user chooses such transaction option, transaction system 1000 can send a confirmation message (text message, push notification, etc.) to wireless client 1310, prompting the user respond to the message by supplying a password, such as a personal identification number (PIN). Upon receiving the response from the user of wireless client 1310 and verifying the password, transaction system 1000 can then process and/or proceed to finalize the transaction.

In some situations, if transaction system 1000 determines that multiple wireless clients 1300 are located within transaction area 1910 and/or proximate to POS module 1100, POS module 1000 can present multiple respective transaction options correlated to the respective multiple wireless clients 1300. Accordingly, the appropriate user wishing to carry out the transaction can choose the proper transaction option correlated thereto, and confirm the transaction with his/her password.

The security of wireless transaction system 1000 thus remains assured provided that (1) the user does not lose his/her registered wireless client, and (2) the user's password does not get compromised. If one of the two assumptions is broken, the wireless transaction system 1000 still remains secure.

DETAILED DESCRIPTION

In one embodiment, a system and/or an apparatus can comprise a client ID module and a localization module. The client module can be configured to (a) scan a wireless channel set at a business locale for wireless signals of a registered customer set, to (b) identify, out of the wireless signals, first wireless packets of a first client of the registered customer set; and to (c) calculate a first client signal strength of the first wireless packets. The localization module can be configured to calculate whether the first client is at a transaction area of the business locale based on the first client signal strength and without reliance on NFC technology.

In one example, a method for transacting with wireless clients can comprise (a) scanning, via a scanning module, a wireless channel set at a business locale for wireless signals of a registered customer set, (b) identifying via the scanning module, out of the wireless signals, first wireless packets of a first client of the registered customer set, (c) calculating, via the scanning module, a first client signal strength of the first wireless packets; and (d) calculating, via a localization module, whether the first client is at a transaction area of the business locale based on the first client signal strength and without reliance on NFC technology.

In one example, a method comprise providing a client ID module, and providing at least one of a training module or a point of service module. The client ID module can comprise a scanning module and a localization module. The client ID module can be configured to (a) scan a wireless channel set at a business locale for wireless signals of a registered customer set; (b) identify, out of the wireless signals, first wireless packets of a first client of the registered customer set; and (c) calculate a first client signal strength of the first wireless packets. The localization module can be configured to calculate whether the first client is at a transaction area of the business locale based on the first client signal strength and without reliance on NFC technology. The training module can be configured to generate a first signal strength chart of a portion of the business locale for a first reference device type, against which first signal strength chart the localization module can compare the first client signal strength to locate the first client; The POS module can be configured to present, at the transaction area, a user interface comprising a first transaction option correlated to the first client based on the calculation by the localization module of whether the first client is at the transaction area.

Other examples and embodiments are further disclosed herein. Such examples and embodiments may be found in the figures, in the claims, and/or in the present description.

Figure 2:
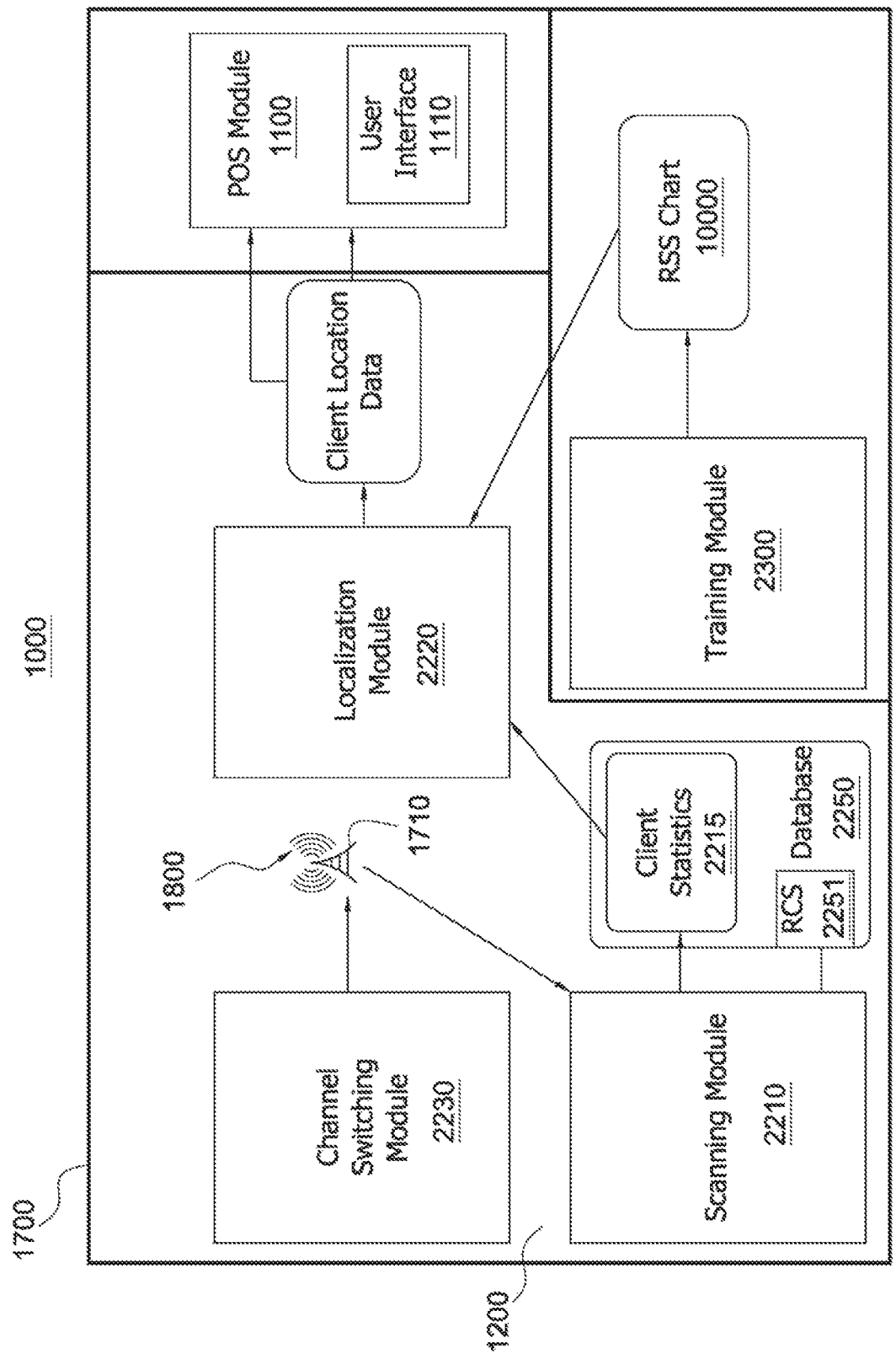
FIG. 2 illustrates a block diagram of the transaction system of FIG. 1 with respect to one embodiment thereof.

FIG. 2 illustrates a block diagram of the transaction system 1000 introduced above in FIG. 1, with respect to one embodiment thereof. Transaction system 1000 comprises client identification (ID) module 2210, which includes scanning module 2210 and localization module 2220 in the present example. Scanning module 2210 is configured to identify the presence of one or more wireless clients 1300 (FIG. 1), and Localization module 2220 is configured to determine a location of such wireless clients 1300 within business locale 1900. Transaction system 1000 also comprises POS module 1100, which is configured to interface with users 1400 of wireless clients 1300 at transactional area 1910 (FIG. 1) based on wireless client information determined by client ID module 1200. The present embodiment also comprises training module 2300, which is configured to measure environment fingerprint information about business locale 1900 with respect to reference wireless clients, where such environment fingerprint information can be later used by client ID module 1200 to locate individual ones of wireless clients 1300 at business locale 1900 (FIG. 1). Although FIG. 2 illustrates client ID module 1200 and POS module 1100 as distinct from each other, there can be embodiments where such modules can be part of each other and/or coupled together as seen in FIG. 1. In addition, there can also be other embodiments where training module 2300 can be optional and/or detached from client ID module 1200.

In some examples, at least part of transaction system 1000, such as scanning module 2210 and/or localization module 2220, can be implemented via computing device 1700. (FIG. 1) Computing device 1700 comprises a desktop computer in the present example, but there can be other examples where computing device 1700 can comprise a laptop computer, a notebook computer, a tablet computer, and/or other computing devices with wireless functionality. The wireless functionality of computing device 1700 can comprise radio 1710 operating pursuant to the WiFi standard (IEEE 802.11) such as in the present embodiment, but can also be based on other standards such as Bluetooth® or WPAN (IEEE 802.15), and/or cellular standards like W-CDMA, HSPA, EDGE, WiMAX, and/or LTE, among others. It is understood that additional and/or alternate hardware, radio technologies, and/or operating systems may be utilized within the scope of this disclosure.

WiFi usage on modern wireless clients such as smartphones is growing rapidly, and most smartphones include WiFi radio hardware to connect to wireless access points. Since the current trend is for cellular data plans to move from unlimited to limited and tiered bandwidth usage, it is expected that WiFi will continue to be popular on smartphones in the future.

Figure 3:
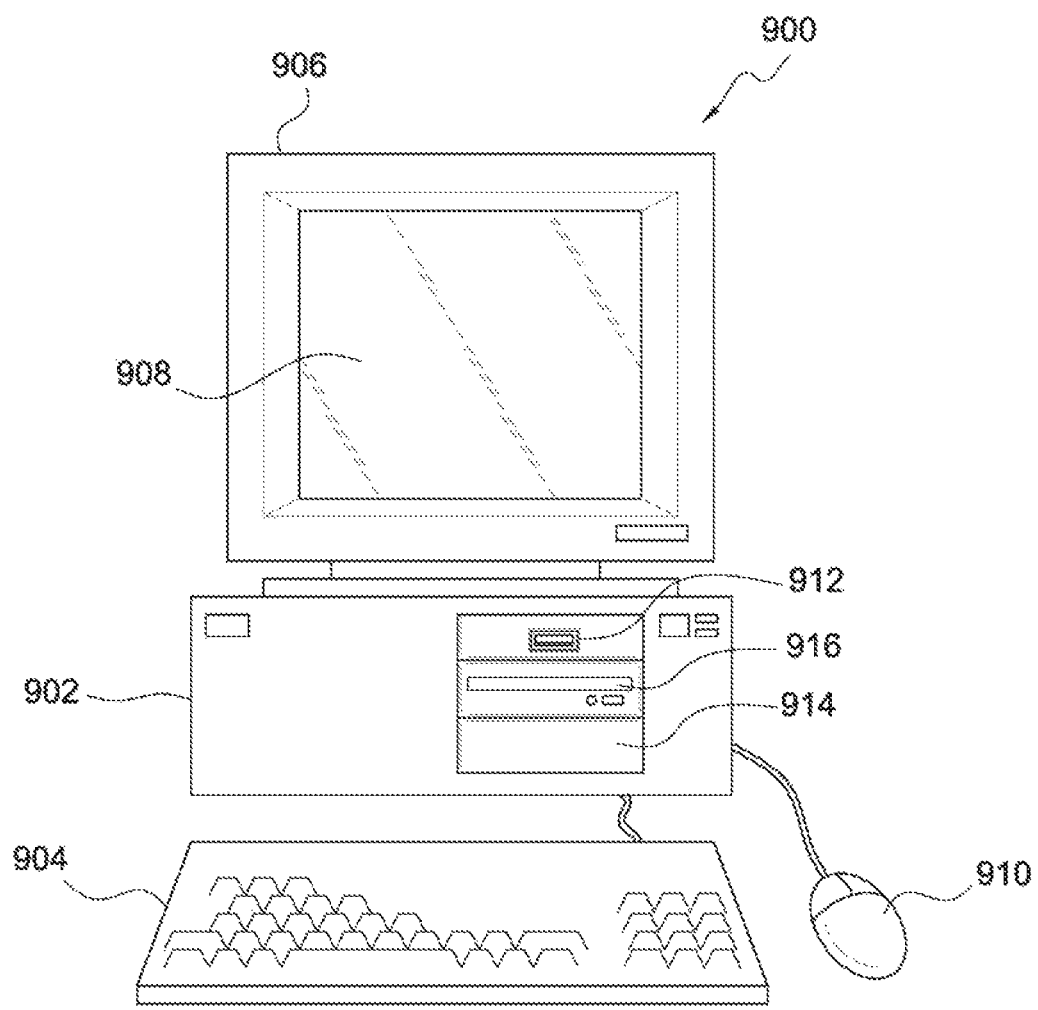
FIG. 3 illustrates a computer suitable for implementing an embodiment of at least a portion of the transaction system of FIG. 1.
Figure 4:
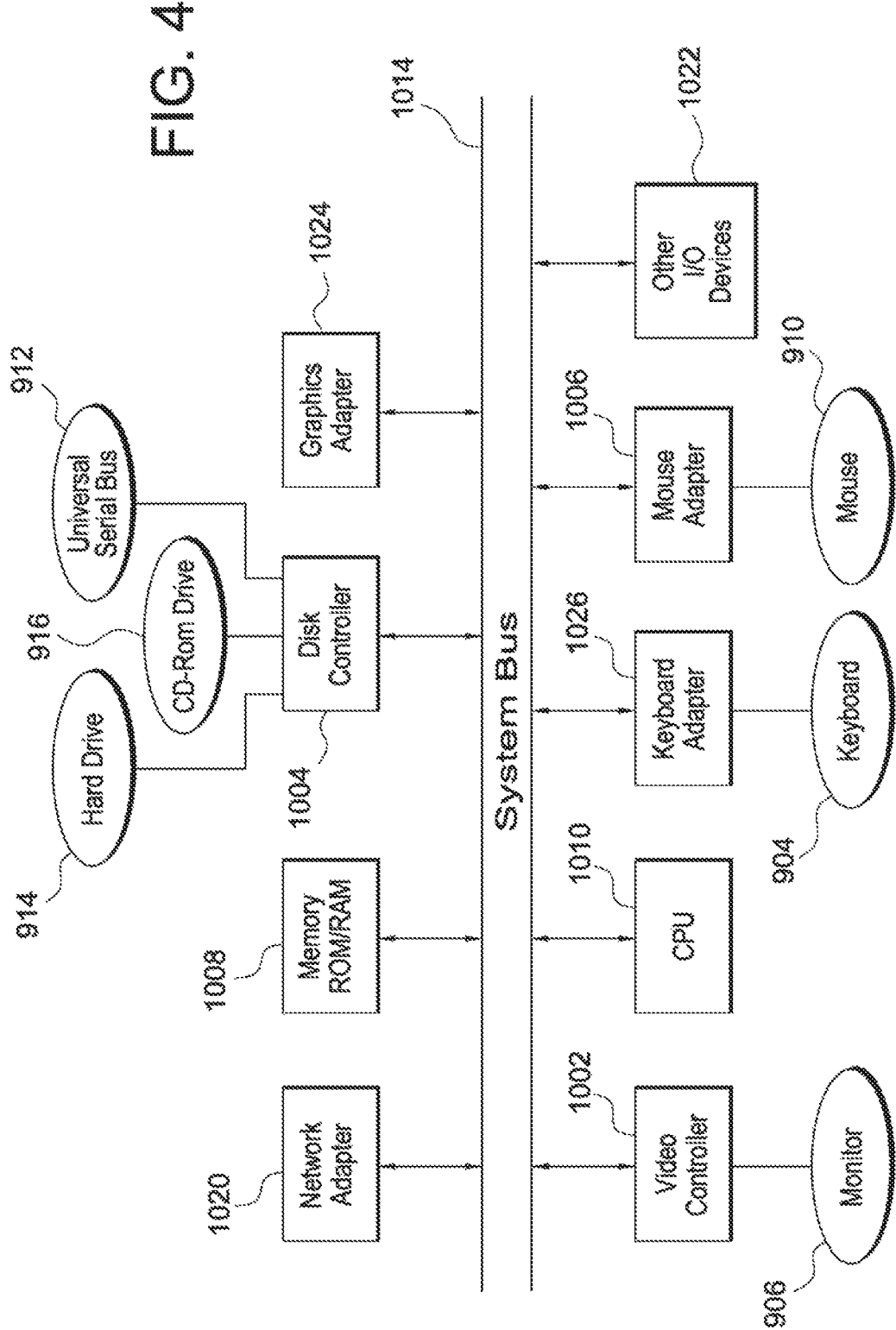
FIG. 4 presents a representative block diagram of elements of the computer of FIG. 3.

FIG. 3 illustrates a computer 900 suitable for implementing an embodiment of computing device 1700. Computer 900 includes a chassis 902 containing one or more circuit boards (not shown), a USB (universal serial bus) port 912, a Compact Disc Read-Only Memory (CD-ROM) and/or Digital Video Disc (DVD) drive 916, and a hard drive 914. A representative block diagram of the elements included on the circuit boards inside chassis 902 is shown in FIG. 4. A central processing unit (CPU) 1010 is coupled to a system bus 1014 in FIG. 4. In various embodiments, the architecture of CPU 1010 can be compliant with any of a variety of commercially distributed architecture families.

System bus 1014 also is coupled to memory 1008 that includes both read only memory (ROM) and random access memory (RAM). Non-volatile portions of memory 1008 or the ROM can be encoded with a boot code sequence suitable for restoring computer 900 (FIG. 3) to a functional state after a system reset. In addition, memory 1008 can include microcode such as a Basic input-Output System (BIOS). In the depicted embodiment of FIG. 4, various 10 devices such as a disk controller 1004, a graphics adapter 1024, a video controller 1002, a keyboard adapter 1026, a mouse adapter 1006, a network adapter 1020, and other I/O devices 1022 can be coupled to system bus 1014. Keyboard adapter 1026 and mouse adapter 1006 are coupled in the present example to keyboard 904 and mouse 910, respectively, of computer 900. While graphics adapter 1024 and video controller 1002 are indicated as distinct units in FIG. 4, video controller 1002 can be integrated into graphics adapter 1024, or vice versa in other embodiments. Video controller 1002 is suitable for refreshing monitor 906 to display images on a screen 908 of computer 900. Disk controller 1004 can control hard drive 914, USB port 912, and/or CD-ROM or DVD drive 916. In other embodiments, distinct units can be used to control each of these devices separately.

Network adapters 1020 can be coupled to one or more antennas. In some embodiments, network adapter 1020 can be configured for WiFi communication (IEEE 802.11), and/or may be part of a WNIC (wireless network interface controller) card (not shown) plugged or coupled to an expansion port (not shown) in computer 900. Such WNIC card can be a wireless network card built into internal computer 900 in some examples. A wireless network adapter can be built into internal client computer 900 by having wireless Ethernet capabilities integrated into the motherboard chipset, or implemented via a dedicated wireless Ethernet chip, connected through the PCI (peripheral component interconnector) or a PCI express bus. In the same or other embodiments, network adapters 1020 can be configured for communication via other wireless protocols, such as via WPAN (IEEE 802.15), and/or via cellular data like W-CDMA, HSPA, HSPA+, EDGE, WiMAX, LTE, or others. In other embodiments, network adapter 1020 can be a wired network adapter.

Although other components of computer 900 are not shown, such components and their interconnection are well known to those of ordinary skill in the art. Accordingly, further details concerning the construction and composition of computer 900 and the circuit boards inside chassis 902 need not be discussed herein.

Figure 10:
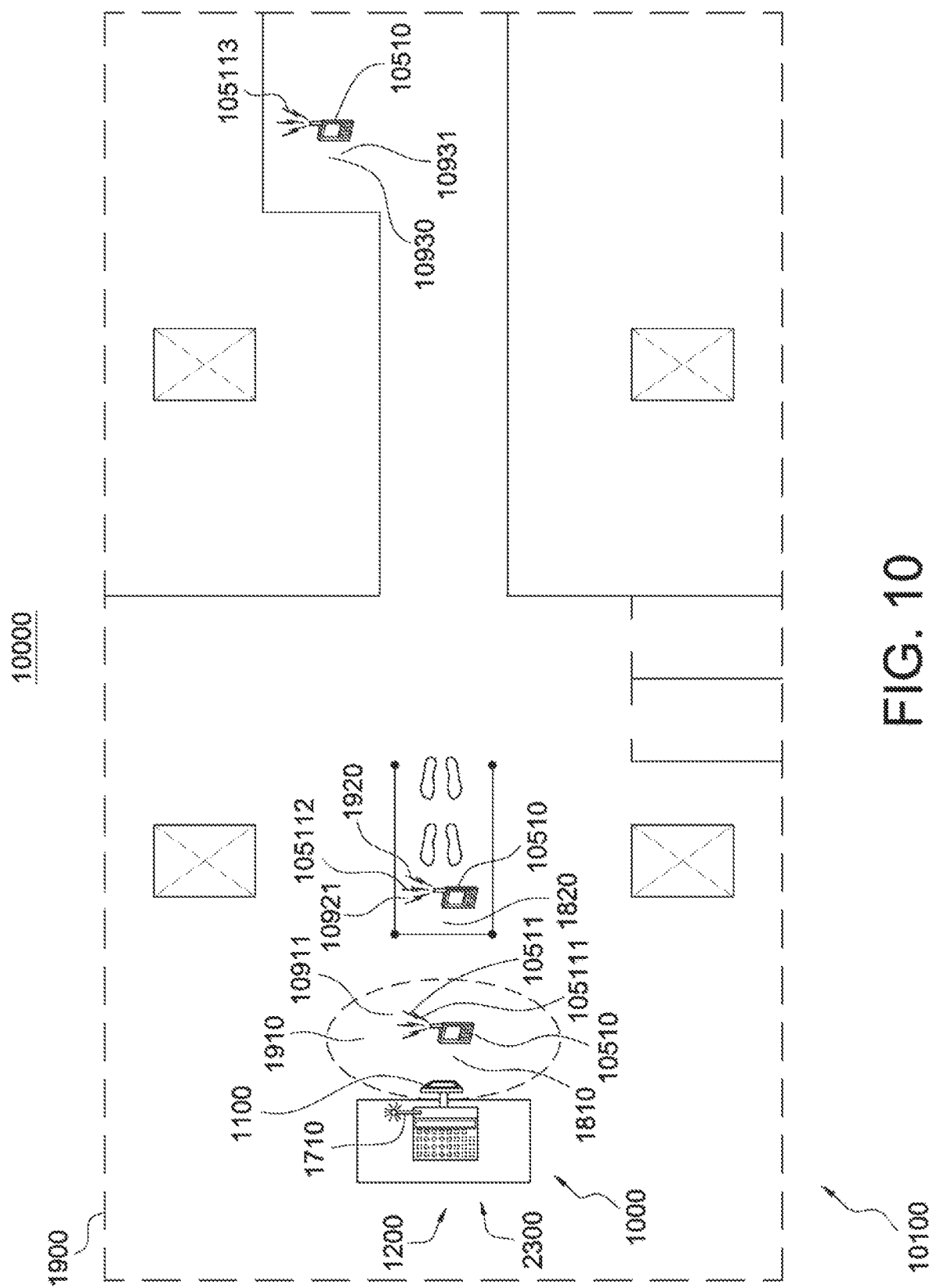
FIG. 10 illustrates a Received Signal Strength (RSS) chart in map format for a reference device type, with respect to which one or more wireless clients can be localized by the transaction system at the business locale.

When computer 900 is in operation, program instructions stored on hard drive 914, on memory 1008, on a USB drive in USB port 912, and/or on a CD-ROM or DVD in CD-ROM and/or DVD drive 916, can be executed by CPU 1010 (FIG. 10). Such program instructions may correspond to an operating system (OS) such as a Microsoft Windows (OS), an Apple iOS OS, a Linux OS, and/or an Android OS, among others. A portion of such program instructions can be suitable for implementing or carrying out the systems and methods described herein.

Backtracking to FIGS. 1-2, client ID module 1200 comprises scanning module 2210, which is configured to passively scan wireless channel set 1600 at business locale 1900 for wireless signals from wireless clients 1300 of registered customer set 2251, and to identify, out of such wireless signals, wireless packets of respective wireless clients 1300 of registered customer set 2251. Registered customer set 2251 can be a list or data structure with information about customers that have registered for service from transaction system 1000, and can be accessed by scanning module 2210 from database 2250 either locally or remotely, such as via the Internet. FIG. 5 illustrates an example of information contained by registered customer set 2251 as stored in database 2250.

In the present example, with respect to FIG. 1, scanning module 2210 can scan wireless channel set 1600 for wireless signals of wireless clients 1300, and can detect wireless packets 1311 from wireless client 1310 of user 1410, wireless packets 1321 from wireless client 1320 of user 1420, and wireless packets 1331 from wireless client 1330 of user 1430. For purposes of the present example, users 1410 and 1420 have signed up their respective wireless clients 1310 and 1320 for service from transaction system 1000, but user 1430 has not. Accordingly, as seen in FIG. 5, client ID information 510 for wireless clients 1310 and 1320 of respective users 1410 and 1420 exists at database 2250 as part of registered customer set 2251, but not for wireless client 1330 of user 1430. Scanning module 2210 can thus compare data from wireless packets 1311, 1321, and 1331 against client ID information 510 of registered customer set 2251 to thereby identify that wireless clients 1310 and 1320 belong to registered customer set 2251 and have registered for service, and that wireless client 1330 has not.

While scanning wireless channel set 1600, scanning module 2210 can set a radio driver for radio 1710 to a passive listening mode (e.g., "monitor" or "pseudo IBSS"), and/or to a promiscuous mode to scan for wireless packets from wireless clients 1300. With respect to WiFi, an example of such passive listening mode configuration can be the "monitor" mode supported by Intel® wireless chipset radios using the "iwlwifi" drivers, and the "pseudoIBSS" mode supported by Atheros® chipset radios using the "madwifi" drivers. In such passive listening mode, the WiFi radio does not associate to any wireless access point, but can be set to listen on any frequency/channel. Channel set 1600 supports 11 channels (from 1 to 11) in the 2.4 GHz frequency spectrum for WiFi 802.11 b/g, and support several channels in the 5 Ghz spectrum (the exact channels supported varies between countries) for WiFi 802.11a. Radio 1710 can be set to monitor one or more of these WiFi channels as part of wireless channel set 1600, and can receive wireless packets that any of wireless clients 1300 transmits on such channel(s).

In some examples, scanning module 2210 can use a packet capture library, such as the Linux libpcap library, and may activate a callback module every time a new wireless packet from wireless clients 1300 is received. Such callback module of scanning module 2210 can mad the packet for client statistics 2215, including a received signal strength (RSS) transmission rate, frequency, and/or length, and can record such client statistics 2215 in a data structure such as a hash table. In some examples such data structure for client statistics 2212 can be stored at database 2250.

As seen in FIG. 2, radio 1710 is coupled in the present embodiment to switching module 2230, which is configured to cause the radio driver for radio 1710 to switch between the different channels of wireless channel set 1600. Due to the switching provided by switching module 2230, scanning module 2210 can gather information from the wireless packets sent by wireless clients 1300 amongst the different frequency channels of wireless channel set 1600. In order to monitor as many wireless packets as possible, switching module 2230 can be set to rapidly switch between all the possible channels of wireless channel set 1600. Channel switching incurs latency, so it can be important to choose the most likely channels that wireless clients 1300 may transmit through. With respect to WiFi, out of the 11 possible 802.11 b/g channels, only 3 are non-overlapping (1, 6 and 11), and thus most wireless access points are set up on one of these three channels. Accordingly, switching module 2230 can be configured to focus on non-overlapping channels by, for example, scanning them more repeatedly than other wireless channels. In the same or other examples scanning module 2210 can be configured to determine, via the switching provided by switching module 2230, which channels of wireless channel set 1600 are currently high-traffic channels for wireless clients 1300 of registered customer set 2251 at business locale 1900. Once such high-traffic channels are determined, scanning module can be configured to scan, via the switching provided by switching module 2230, each channel of wireless channel set 1600 in a probabilistic weighted order where the high-traffic channels are scanned for the wireless signals more repeatedly than lower-traffic channels of wireless channel set 1600. Alternatively, the scanning module 2210 could employ multiple radios, each scanning on different non-overlapping sets of frequency channels.

The wireless packets received by scanning module 2210 can be subdivided into several portions according to the packet structure designated by their corresponding wireless protocol. Scanning module 2210 can extract packet header information from the wireless packets of wireless clients 1300. Accordingly, whether for WiFi or other wireless communication protocols, scanning module 2210 can be configured to extract client identifier information from the packet headers of wireless packets it receives. For example, scanning module 2210 can parse wireless packets 1311 of wireless client 1310 to extract client identifier 13111 therefrom, and can then identify wireless client 1310 as pertaining to registered customer set 2251 by comparing client identifier 13111 against client ID information 510 (FIG. 5) from registered customer set. 2251 in database 2250. In some examples, scanning module 2210 can scan for wireless packets 1311, and/or parse wireless packets 1311, based on a WiFi IEEE 802.11 packet structure, a WPAN IEEE 802.15 packet structure, and/or based on a cellular data packet structure. In the same or other examples, client identifier 13111 can comprise at least one of a Media Access Control (MAC) address or an Extended Unique Identifier (EUI) address.

Having identified wireless client 1310 based on wireless packets 1311 as described above, the presence of wireless client 1310 within business locale 1900 is thus established. Scanning module 2210 can also determine other information, statistics, or meta-data from wireless packets 1311 about wireless client 1310 to assist in locating wireless client 1310 within business locale 1900. In some examples, such meta-data can comprise a client device type of wireless client 1310, where such client device type can comprise information such as a type, brand, and/or model of the wireless client 1310. For instance, based on client identifier 13111 extracted from wireless packets 1311, scanning module 2210 can cross-reference registered customer set 2251 (FIG. 5) for the corresponding entries for wireless client 1310, and thus extract therefrom client device type information 530 for wireless client 1310.

In the same or other examples, the meta-data determined by scanning module 2210 from wireless packets 1311 can comprise a bitrate for wireless packets 1311, a frequency channel for wireless packets 1311, and/or a received signal strength (RSS) for wireless packets 1311 of wireless client 1310. The RSS can be calculated by scanning module 2210 while monitoring from wireless packets 1311, and can be a good indicator of the proximity of corresponding wireless client 1300 to scanning module 2210 and/or to transactional area 1910 at business locale 1900.

Transaction system 1000 (FIGS. 1-2) comprises localization module 2220 configured to determine the location of wireless clients 1300 identified by scanning module 2210. For example, localization module 2220 can calculate whether wireless client 1310 is located at transaction area 1910 of business locale 1900 based on the RSS calculated by scanning module 2210 for wireless packets 1311. In one simplified implementation, localization module 2220 can compare the RSS for the different wireless clients 1300 at business locale 1900, and ascertain that the one with the greatest RSS is likely to be located closest to radio 1710 and thus located at transaction area 1910. Other localization techniques are further described below. Localization module 2220 can thus calculate such location of wireless client 1310 and/or the location of other ones of wireless clients 1300 without reliance on NFC technology, such that transaction system 1000 can be made accessible to wireless clients 1300 without requiring them to have NFC hardware or software.

Figure 6:
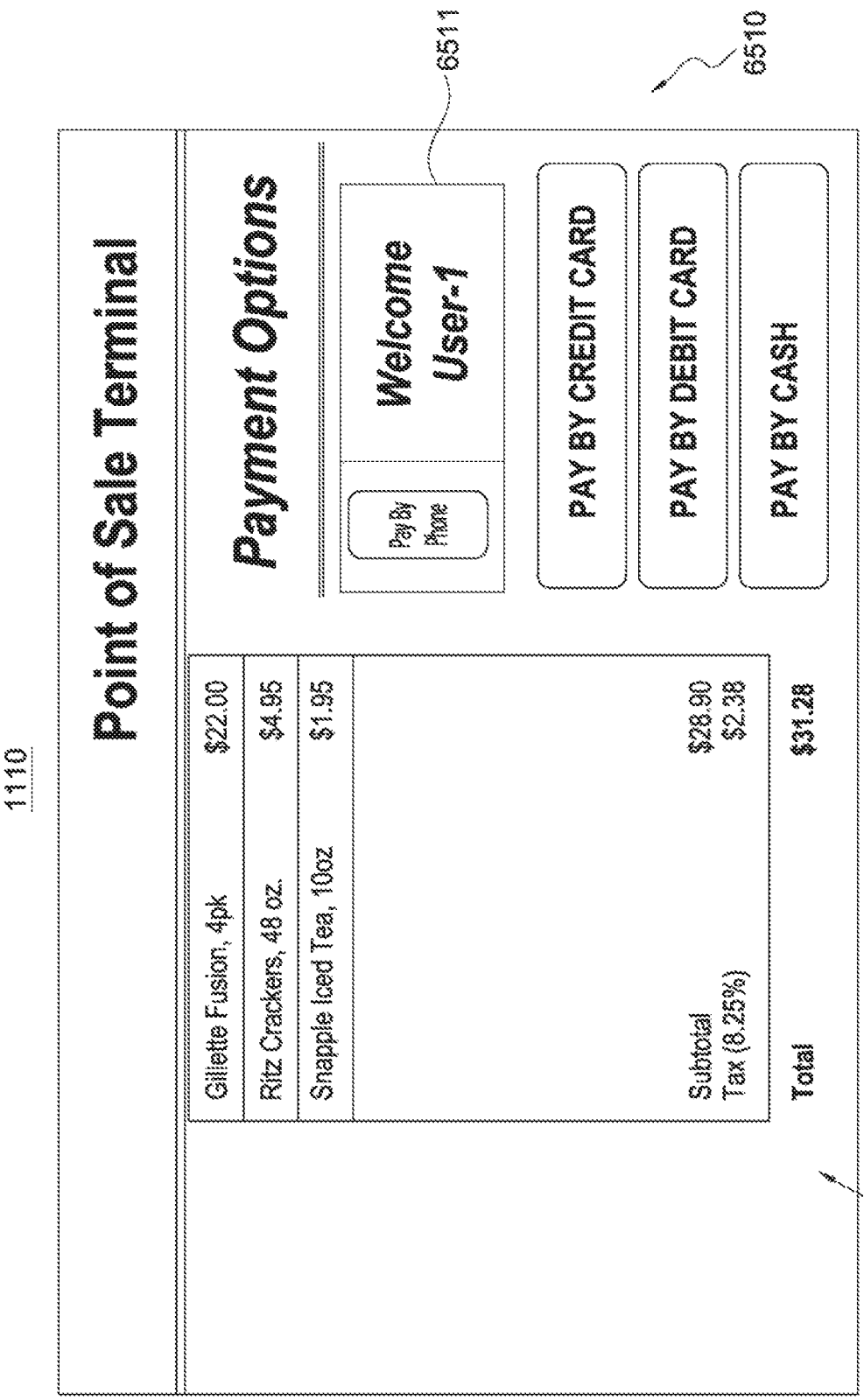
FIG. 6 illustrates a screen of a user interface of a point of service module of the transaction system, presenting a transaction option correlated to a first user to request or process a purchase transaction.

Transaction system 1000 further comprises POS module 1100, which is configured to present user interface 1110 at transaction area 1910 of business locale 1900. FIG. 6 illustrates screen 6500 of user interface 1110, which can be presented to a user to process a purchase transaction. For example, once wireless client 1310 has been identified by scanning module 2210 as being present at business locale 1900 and when localization module 2220 has located wireless client 1310 as being at transaction area 1910 of business locale 1900 as described above, user interface screen 6500 can be presented with one or more transaction options 6510, including transaction option 6511, to process a purchase transaction. In the present example, transaction option 6511 is correlated to wireless client 1310 based on the above-described assessment by localization module 2220 that wireless client 1310 is located at transactional area 1910. Accordingly, transaction option 6511 can identify user 1410 (FIG. 1) by name or username, and can provide an alternative to user 1410 to "pay by phone" via wireless client 1310 rather than by credit card or cash.

Figure 7:
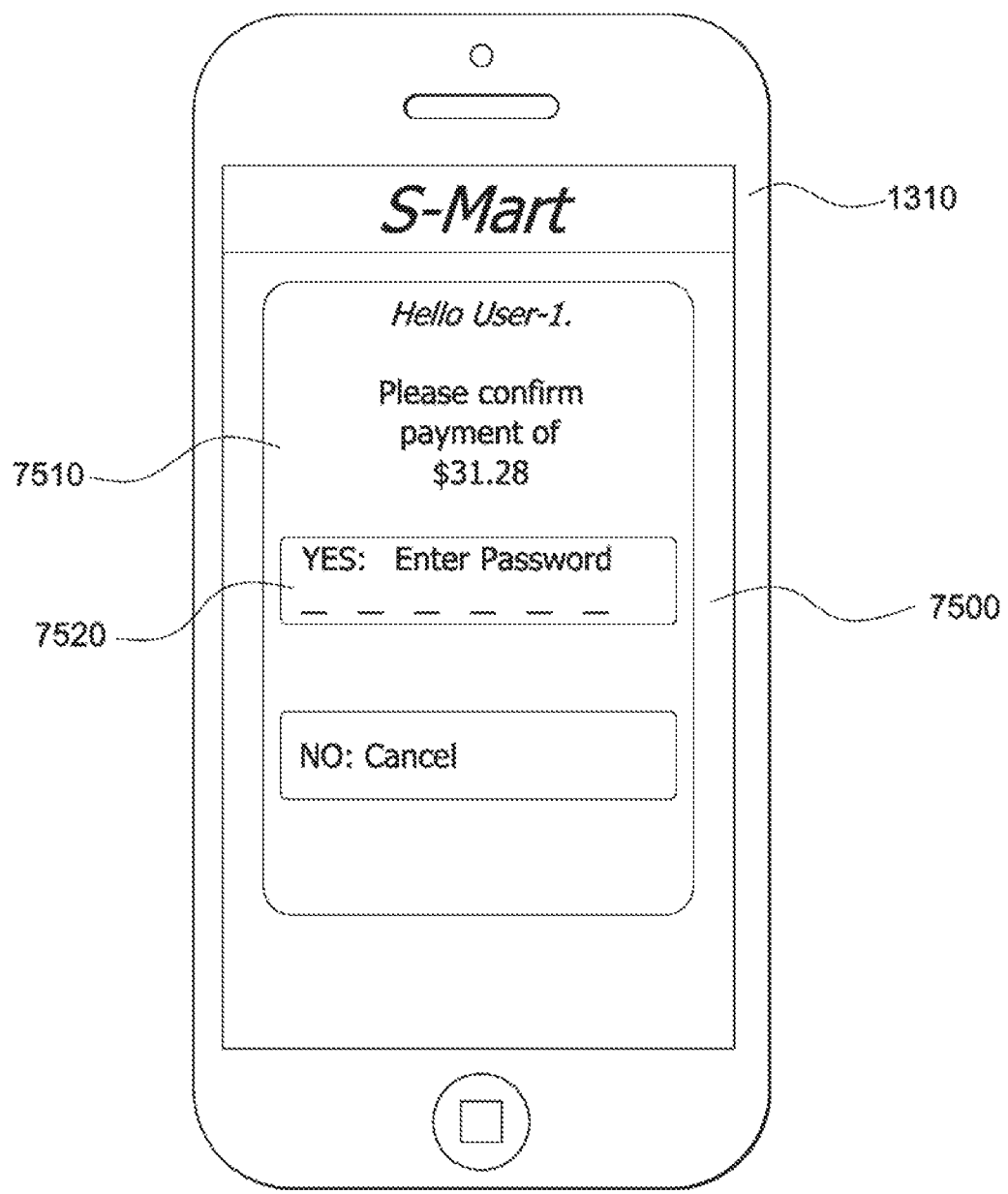
FIG. 7 illustrates a client screen of a wireless client, showing a payment confirmation request received by the wireless client wireless client 1310 from the point of service module, and presented to the first user to request a confirmation of payment for the purchase transaction presented to the user in FIG. 6.

Upon selection of transaction option 6511 by user 1410, POS module 1100 can emit a payment confirmation request to wireless client 1310. FIG. 7 illustrates client screen 7500, which shows payment confirmation request 7510 received by wireless client 1310 and presented thereat to user 1410 to request confirmation of payment for the transaction presented to user 1410 at screen 6500 of user interface 1110 (FIG. 6). In some examples, payment confirmation request 7510 can be sent to wireless client 1310 in the form of a text message, such as an SMS (Short Message Service) message, that can be displayed by wireless client 1310. In the same or other examples, payment confirmation request 7510 can be sent to an application or other software installed on wireless client 1310 and configured to present confirmation request 7510 to user 1410 and to request payment authentication 7520.

After receiving payment confirmation request 7510, user 1410 can accept the transaction by entering his or her user password as payment authentication 7520. Payment authentication 7520 is then sent by wireless client 1310, received wirelessly by POS module 1100, and, if the user password is correct, POS module 1100 can proceed to carry out the transaction by billing the account of user 1410. In the present embodiment, the user password received via payment authentication 7520 can be authenticated by POS module 1100 via comparison with a reference password previously entered by user 1410 for its account with transaction system 1000 (FIG. 1). The reference password can be stored, correlated to wireless client 1310, at registered customer set 2251 for access by POS module 1100 via database 2250 in some embodiments. In the same or other embodiments, payment method information, such as credit card or bank account information, can also be stored correlated to wireless client 1310 at registered customer set 2251 so that POS module 1100 can bill the account of user 1410 accordingly upon receipt of payment authentication 7520.

Figure 8:
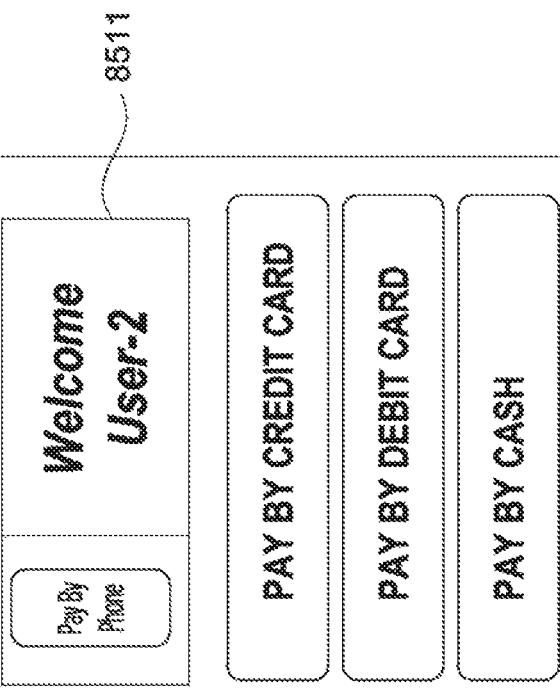
FIG. 8 illustrates a screen of the user interface of the point of service module of the transaction system, presenting a second transaction option correlated to a second user to request or process a purchase transaction.

In some instances, more than one of wireless clients 1300 can be located at business locale 1900 (FIG. 1). For instance, wireless clients 1310 and 1320 could be both located at or close to transactional area 1910. In such situations, scanning module 2210 (FIG. 2) can be configured to identify wireless packets 131 of wireless client 1310 and wireless packets 1321 of wireless client 1320, and to calculate the RSS for wireless packets 1311 and 1321 (FIG. 1). Localization module 2220 can then compare the RSS of wireless packets 1311 against the RSS of wireless packets 1321. Based on such comparison, if localization module 2220 determines that the RSS of wireless packets 1311 of wireless client 1310 is greater than the RSS of wireless packets 1321 of wireless client 1320, POS module 1100 can proceed to present transaction option 6511 at user interface 1110 for user 1410 as shown in screen 6500 of FIG. 6. To the contrary, if localization module 2220 determines that the RSS of wireless packets 1321 of wireless client 1320 is greater than the RSS of wireless packets 1311 of wireless client 1310, POS module 1100 can proceed to present transaction option 8511 at user interface 1110 for user 14200 as shown in screen 8500 of FIG. 8.

There can be situations where more than one of wireless clients 1300 can be located within transaction area 1910, or be sufficiently close to each other, in such a way that localization module 2220 may have problems distinguishing which of users 1400 is at or closer to user interface 1110 (FIGS. 1-2). For instance, if wireless clients 1310 and 1320 were next to each other within transaction area 1910, the RSS calculated by scanning module 2210 for wireless packets 1311 of wireless client 1310 could be similar to the RSS calculated by scanning module 2210 for wireless packets 1321 of wireless client 1320. In such a situation, localization module 2220 may not be able to properly ascertain which RSS is greater with a minimum degree of certainty. Localization module 2220 may thus not be able to determine whether to present transaction option 6511 (FIG. 6) correlated to wireless client 1310 and user 1410 (FIG. 1), or to present transaction option 8511 (FIG. 8) correlated to wireless client 1320 and user 1420 (FIG. 1). In such circumstances, as seen in FIG. 9, POS module 1100 may present screen 9500 comprising transaction option 6511 for user 1410 to self-identify with respect to wireless client 1310, and comprising transaction option 8511 for user 1420 to self-identify with respect to wireless client 1320.

Transaction system 1000 can be configured in some implementations to generate aggregate statistics from the wireless packets of wireless clients 1300, and to locate individual ones of wireless clients 1300 based on such aggregate statistics. For example, localization module 2220 can be configured to generate aggregate statistics for wireless client 1310 based on wireless packets 1311, including an aggregate RSS of wireless packets 1311 of wireless client 1310 throughout a latest time period.

In some examples, the aggregate RSS of wireless packets 1311 can comprise at least one of a signal strength mean, a signal strength variance, a signal strength median, and/or a signal strength quartile. In the same or other examples, the aggregate statistics for wireless client 1310 can comprise a number of frequency channels used for wireless packets 1311 throughout the latest time period, and/or a number of wireless packets 1311 transmitted throughout the latest time period. Localization module 2220 can also be configured to generate aggregate statistics for wireless client 1302 based on wireless packets 1321, including an aggregate RSS of wireless packets 1321 for the latest time period.

Such aggregation can normalize the statistics calculated by scanning module 2210 from the wireless packets of wireless clients 1300, where such statistics could otherwise vary per individual wireless client in response to, for example, interference or movement within business locale 1900 relative to radio 1710, scanning module 2210, and/or POS module 1100. Thus, the aggregation of statistics can permit the generation of more stable and less noisy RSS values with respect to which localization module 2220 can more reliably ascertain the location of wireless clients 1300 at business locale 1900. Such aggregation can be made throughout a latest time period, which can be of approximately 2 seconds in some implementations, and which can repeat periodically. For instance, if the RSS statistics for wireless packets 1311 of wireless client 1310 do not change significantly throughout the latest time period of aggregation, localization module 2220 can ascertain that wireless client 1310 is not moving within business locale 1900.

In some examples, the aggregate statistics for wireless client 1310 can be based on a time-weighted standard where, with respect to the latest time period, later statistics measured or generated from later ones of wireless packets 1311 are weighted more heavily than earlier statistics measured or generated from earlier ones of wireless packets 1311.

In embodiments where transaction system 1000 aggregates statistics as described above, POS module 1100 can be configured to present transaction option 6511 (FIG. 6) correlated to wireless client 1310 if the aggregate RSS of wireless packets 1311 is greater than the aggregate RSS of wireless packets 1321 by at least a minimum signal strength threshold difference, and/or if the aggregate RSS of wireless packets 1311 is greater than a minimum signal strength threshold value. Similarly, POS module 1100 can be configured to present transaction option 8511 (FIG. 8) correlated instead to wireless client 1320 if the aggregate RSS of wireless packets 132) is greater than the aggregate RSS of wireless packets 1311 by at least the minimum signal strength threshold difference, and/or if the aggregate RSS of wireless packets 1321 is greater than the minimum signal strength threshold value.

As seen in FIG. 2, transaction system 1000 can also optionally comprise training module 2300, which is configured to measure and generate reference environment information with respect to fingerprints of reference wireless devices at business locale 1900. Such reference environment information an be later used to assist client ID module 1200 in locating wireless clients 1300 within business locale 1900.

One approach for client localization in transaction system 1000 can be to generate one or more received signal strength (RSS) charts with training module 2300 with respect to stochastic distributions for wireless signals transmitted under different conditions from several locations in the area of business locale 1900. In some examples, the RSS charts can be conceptualized in terms of a table format and/or a map format. FIG. 10 illustrates RSS chart 10000 in map format 10100 for reference device type 10510 at business locale 1900. FIG. 11 illustrates RSS chart 10000 in table format 11100 for reference device type 10510 at business locale 1900.

The RSS charts can be constructed based on vectors of RSS measurements correlated to a specific locations and/or to specific conditions of corresponding wireless packets from a reference device type. The reference device type can relate to a specific type (cellular phone, smartphone, tablet, etc), brand, and/or model of wireless device for which the RSS chart is built. In some examples, the RSS vectors can be similar to the following: <location, reference device type, bit rate, frequency channel, packet size, RSS>, where such RSS vector specifies an RSS measured for a wireless packet received from a location within business locale 1900, transmitted from a reference device type at a specific bitrate, frequency channel, and packet size.

Data for the RSS vectors can be generated or captured by scanning module 2210 in some implementations from wireless packets of one or more reference wireless devices, and fed to training module 2300 to construct the RSS charts. For instance, FIG. 10 shows RSS chart 10000 in map format 10100, with a layout of business locale 1900 comprising different locations thereat, such as transaction area 1920, queue area 1920 and entrance area 10930. Reference wireless packets 10511 from reference device type 10510 can be originated from different locations of business locale 1900, and processed by training module 2300 to generate RSS vectors therefor with respect to desired ones of the different locations. For instance, reference wireless packets 10511 originated from transaction area 1910 are processed by training module to generate RSS vectors 10911, reference wireless packets 10511 originated from queue area 1920 are processed by training module to generate RSS vectors 10921, and reference wireless packets 10511 originated from entrance area 110930 are processed by training module to generate RSS vectors 109131. FIG. 11 illustrates a subset of corresponding RSS vectors 10911, 10921, and 10931 described above with respect to FIG. 10 under different bitrate, frequency channel, and packet size conditions. In the present example, as seen in FIG. 11, reference device type 10510 comprises an iPhone® 5 from Apple® Corporation. Other RSS charts similar to RSS chart 10000 can be generated for other reference device types with respect to locations 1910, 1920, and 10930 if desired. RSS charts need not be tied to specific device models. For instance, more generic RSS charts may be generated for a generic device type (tablets, cellular phone, smartphones), for devices of a specific wireless carrier (AT&T, Verizon, Sprint, etc.), for devices of a specific wireless technology (WiFi, WPAN, W-CDMA, HSPA, EDGE, WiMAX, LTE, etc.), and/or for devices of a specific brand, among others.

With the RSS charts generated by training module 2300, localization module 2220 can cross-reference what the RSS of a wireless client that corresponds to reference device type 10510 is supposed to be like with respect to the different locations within business locale 1900. Accordingly, with respect to FIG. 1, localization module 2220 can ascertain that, if the RSS of wireless packets 1311 of wireless client 1310 correlates to the RSS of one of RSS vectors 10911 in RSS chart 10000 (FIG. 11) for a corresponding bitrate, frequency channel, and/or packet size, then wireless client 1310 is likely to be located at transaction area 1910.

Considering the above, training module 2220 (FIG. 2) is configured to generate RSS chart 10000 of a portion of business locale 1900 for reference device type 10510, as seen in FIGS. 10-11. RSS chart 10000 can be generated with respect to reference signal strengths 11150 (FIG. 11), which can be determined by scanning module 2210 from reference wireless packets 10511 (FIG. 10) of reference device type 10510. Reference wireless packets 10511 comprise nearby reference wireless packets 105111, which are transmitted by reference device type 10510 from nearby reference location 1810. Reference wireless packets 10511 also comprise distant reference wireless packets 105112, which are transmitted from reference device type 10510 at distant reference location 1820. Reference signal strengths 11150 (FIG. 11) comprise nearby reference signal strengths 11151, which are calculated by scanning module 2210 from nearby reference wireless packets 105111 (FIG. 10). Reference signal strengths 11150 (FIG. 11) also comprise distant reference signal strengths 11152, which are calculated by scanning module 2210 from distant reference wireless packets 105112 (FIG. 10). In the present example, nearby reference location 1810 corresponds to transaction area 1910, which is nearby to radio 1710 through which reference wireless packets 10511 are received by transaction system 1000 for processing by scanning module 2220. Distant reference location 1820 corresponds to queue area 1920, which is more distant with respect to radio 1710. In other implementations, other areas of business locale 1900 can correspond to nearby reference location 1810 and/or distant reference location 1820.

Once RSS chart 10000 is generated by training module 2300, it can be stored for future access by localization module 2220 when determining the localization of wireless clients 1300 (FIG. 1). In some examples, RSS chart 10000 (FIGS. 10-11) can be stored at database 2250 (FIG. 2). With respect to the example of FIG. 1, to localize wireless client 1310 within business locale 1900, scanning module 2220 (FIG. 2) would first identify wireless client 1310 (FIG. 1) as being present within business locale 1900, and would determine the RSS and other information or meta-data from wireless packets 1311 as described above. Localization module 2220 (FIG. 2) could then compare such information about wireless packets 1311 of wireless client 1310 against RSS chart 10000 (FIGS. 10-11). For instance, in some implementations, localization module 2220 can compare the RSS of wireless packets 1311 (FIG. 1) against reference signal strengths 1150 (FIG. 11) that correspond to the reference device type, bitrate, frequency channel, and/or packet size of wireless packets 1311. As an example, if the RSS from wireless packets 1311 (FIG. 1) corresponds to one of nearby reference signal strengths 11151 (FIG. 11), localization module 2220 can ascertain that the location of wireless client 1310 is likely to be at transaction area 1910 (FIG. 1). As another example, if the RSS from wireless packets 1311 (FIG. 1) corresponds to one of distant reference signal strengths 11152 (FIG. 11), localization module 2220 can ascertain that the location of wireless client 1310 is likely to be at queue area 1920 (FIG. 1).

As described above, training module 2300 can also be configured to generate other RSS charts for different reference device types. Thus, besides RSS chart 10000 for reference device type 10510 (FIGS. 10-11), training module 2300 can generate a second RSS chart similar to RSS chart 10000 but for a second reference device type. Thus, if the client device type of wireless client 1310 did not match that of reference device type 10510 for RSS chart 1000, or if the client device type or wireless client 1310 could not be determined, localization module 2220 could proceed to compare the RSS of wireless packets 1310 against the reference signal strengths of the other RSS charts, such as said second RSS chart, and thereby try to ascertain the location of wireless client 1310.

Training module 2300 can also be configured to generate RSS charts for different reference bitrates. In the present example of FIGS. 10-11, the bitrates at which reference device type 10510 can transmit reference wireless packets 10511 can vary, such that not all of reference wireless packets 10511 are transmitted at the same bitrate. RSS chart 10000 comprises entries for reference signal strengths 11150 from reference wireless packets 10511 of corresponding different reference bitrates (labeled BR-1 and BR-2). Thus, RSS vector entries for bitrate BR-1 in RSS chart 10000 comprise a first RSS chart with respect to bitrate BR-1, and RSS vector entries for bitrate BR-2 in RSS chart 10000 comprise a second RSS chart with respect to bitrate BR-2.

As previously described, to locate wireless client 1310 at business locale 1900 (FIG. 1), scanning module 2210 can be configured to determine the client device type and the bitrate of wireless packets 1311 of wireless client 1310. Localization module 2220 can thus use such information to narrow or focus its comparison of wireless packets 1311 against such first or second RSS charts of RSS chart 10000 to localize wireless client 1310.

For instance, if the client device type of wireless client 1310 (FIG. 1) corresponds to the reference device type of RSS chart 10000 (FIG. 11), localization module 2220 can compare the bitrate of wireless packets 1311 (FIG. 1) against the different bitrates of the RSS vector entries in RSS chart 10000 (FIG. 11). Thus, if the bitrate of wireless packets 1311 correlates to bitrate BR-1, localization module 2220 can proceed to ascertain the location of wireless client 1310 based on a comparison between the RSS of wireless packets 1311 against the reference signal strengths for bitrate BR-1 in RSS chart 10000 (FIG. 11) Similarly, if the bitrate of wireless packets 1311 correlates to bitrate BR-2, localization module 2220 can proceed to ascertain the location of wireless client 1310 based on a comparison between the RSS of wireless packets 1311 against the reference signal strengths for bitrate BR-2 in RSS chart 10000 (FIG. 11).

Training module 2300 can also be configured to generate RSS charts for different reference frequency channels. In the present example of FIGS. 10-11, the frequency channels at which reference device type 10510 can transmit reference wireless packets 10511 can vary, such that not all of reference wireless packets 10511 need be transmitted at the same frequency channel. RSS chart 10000 comprises entries for reference signal strengths 1150 from reference wireless packets 10511 of corresponding different reference frequency channels (labeled FC-1 and FC-2). Thus, RSS vector entries for frequency channel FC-1 in RSS chart 10000 comprise a first RSS chart with respect to frequency channel FC-1, and RSS vector entries for frequency channel FC-2 in RSS chart 10000 comprise a second RSS chart with respect to frequency channel FC-2.

As previously described, to locate wireless client 1310 at business locale 1900 (FIG. 1), scanning module 2210 can be configured to determine the client device type and the frequency channel of wireless packets 1311 of wireless client 1310. Localization module 2220 can thus use such information to narrow or focus its comparison of wireless packets 1311 against such first or second RSS charts of RSS chart 10000 to localize wireless client 1310.

For instance, if the client device type of wireless client 1310 (FIG. 1) corresponds to the reference device type of RSS chart 10000 (FIG. 1), localization module 2220 can compare the frequency channel of wireless packets 1311 (FIG. 1) against the different frequency channels of the RSS vector entries in RSS chart 10000 (FIG. 11). Thus, if the frequency channel of wireless packets 1311 correlates to frequency channel FC-1, localization module 2220 can proceed to ascertain the location of wireless client 1310 based on a comparison between the RSS of wireless packets 1311 against the reference signal strengths for frequency channel FC-1 in RSS chart 10000 (FIG. 11). Similarly, if the frequency channel of wireless packets 1311 correlates to frequency channel FC-2, localization module 2220 can proceed to ascertain the location of wireless client 1310 based on a comparison between the RSS of wireless packets 1311 against the reference signal strengths for frequency channel FC-2 in RSS chart 10000 (FIG. 11).

Training module 2300 can also be configured to generate RSS charts with respect to both different reference frequency channels and different reference bitrates. In the present example of FIGS. 10-11, RSS chart 10000 comprises entries for reference signal strengths 11150 from reference wireless packets 10511 of corresponding different reference bitrates (labeled BR-1 and BR-2) and different reference frequency channels (labeled FC-1 and FC-2). Thus, (a) RSS vector entries for bitrate BR-1 and frequency channel FC-1 in RSS chart 10000 comprise a first RSS chart, (b) RSS vector entries for bitrate BR-2 and frequency channel FC-2 in RSS chart 10000 comprise a second RSS chart, (c) RSS vector entries for bitrate BR-1 and frequency channel FC-2 in RSS chart 10000 comprise a third RSS chart, and (d) RSS vector entries for bitrate BR-2 and frequency channel FC-1 in RSS chart 10000 comprise a fourth RSS chart.

As previously described, to locate wireless client 1310 at business locale 1900 (FIG. 1), scanning module 2210 can be configured to determine the client device type, the bitrate, and the frequency channel of wireless packets 1311 of wireless client 1310. Localization module 2220 can thus use such information to narrow or focus its comparison of wireless packets 1311 against such first, second, third, or fourth RSS charts of RSS chart 10000 to localize wireless client 1310.

For instance, if the client device type of wireless client 1310 (FIG. 1) corresponds to the reference device type of RSS chart 10000 (FIG. 11), localization module 2220 can compare the bitrate of wireless packets 1311 (FIG. 1) against the different bitrates of the RSS vector entries in RSS chart 10000 (FIG. 11), and can compare the frequency channel of wireless packets 1311 (FIG. 1) against the different frequency channels of the RSS vector entries in RSS chart 10000 (FIG. 11).

Thus, if the bitrate of wireless packets 1311 correlates to bitrate BR-1, and the frequency channel of wireless packets 1311 correlates to frequency channel FC-1, localization module 2220 can proceed to ascertain the location of wireless client 1310 based on a comparison between the RSS of wireless packets 1311 against the reference signal strengths corresponding to both bitrate BR-1 and frequency channel FC-1 in the first RSS chart of RSS chart 10000 (FIG. 11).

Similarly, if the bitrate of wireless packets 1311 correlates to bitrate BR-2, and the frequency channel of wireless packets 1311 correlates to frequency channel FC-2, localization module 2220 can proceed to ascertain the location of wireless client 1310 based on a comparison between the RSS of wireless packets 1311 against the reference signal strengths corresponding to both bitrate BR-2 and frequency channel FC-2 in the second RSS chart of RSS chart 10000 (FIG. 11).

Similarly, if the bitrate of wireless packets 1311 correlates to bitrate BR-1, and the frequency channel of wireless packets 1311 correlates to frequency channel FC-2, localization module 2220 can proceed to ascertain the location of wireless client 1310 based on a comparison between the RSS of wireless packets 1311 against the reference signal strengths corresponding to both bitrate BR-1 and frequency channel FC-2 in the third RSS chart of RSS chart 10000 (FIG. 11).

Similarly, if the bitrate of wireless packets 1311 correlates to bitrate BR-2, and the frequency channel of wireless packets 1311 correlates to frequency channel FC-1, localization module 2220 can proceed to ascertain the location of wireless client 1310 based on a comparison between the RSS of wireless packets 1311 against the reference signal strengths corresponding to both bitrate BR-2 and frequency channel FC-1 in the fourth RSS chart of RSS chart 10000 (FIG. 11).

Figure 12:
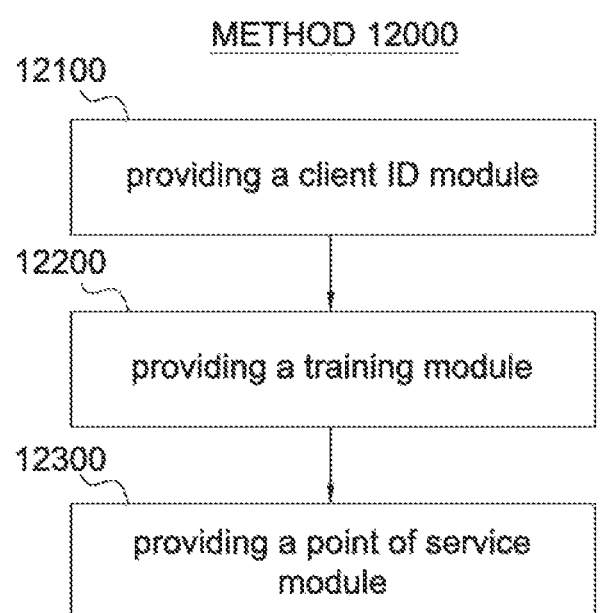
FIG. 12 illustrates a flowchart for a method of providing the wireless transaction system.

Moving on, FIG. 12 illustrates a flowchart for a method 12000 of for providing a wireless transaction system. In some implementations, the wireless transaction system can be similar to transaction system 1000 as described above with respect to FIGS. 1-11.

Method 12000 comprises block 12100 for providing a client ID module. In some embodiments, the client ID module can be similar to client ID module 1200 (FIG. 2). The client ID module of block 12100 can comprise in some implementations a channel switching module (which can be similar to channel switching module 2230 (FIG. 2) as described above), a scanning module (which can be similar to scanning module 2210 (FIG. 2) as described above), and/or a localization module (which can be similar to localization module 2220 (FIG. 2) as described above).

Method 12000 can also optionally comprise blocks 12200 and/or block 12300. Block 12200 can comprise providing a training module, which can be similar in some embodiments to training module 2300 (FIG. 2) as described above. Block 12300 can comprise providing a point of service module, which can be similar in some embodiments to POS module 1100 (FIGS. 1-2) as described above.

FIG. 13 illustrates a flowchart for a method 13000 for transacting with wireless clients via a transaction system. In some examples, the transaction system can be similar to transaction system 1000 as described above with respect to FIGS. 1-12. In the same or other examples, the wireless clients can be similar to wireless clients 1300 (FIG. 1) as also described above.

Method 13000 can comprise block 13100 for generating, with a training module, a first signal strength chart of a portion of a business locale. In some examples, the training module can be similar to training module 2300 (FIG. 2) of transaction system 1000, while the signal strength chart can be similar to signal strength chart 10000 (FIGS. 10-11) or variation thereof. Similarly, the business locale can be similar to business locale 1900 (FIGS. 1, 10), or another business locale for which wireless client localization is desired. Block 13100 can be optional in some implementations.

Block 13200 of method 13000 comprises scanning, via a scanning module, a wireless channel set at the business locale for wireless signals of a registered customer set. In some examples, the scanning module can be similar to scanning module 2230 (FIG. 2) as described above. The wireless channel set, the wireless signals, and the registered customer set can be respectively similar to wireless channel set 1600, to the wireless signals of wireless clients 1300, and to registered customer set 2251 as described above with respect to FIGS. 1-2 and the different implementations of transaction system 1000 (FIGS. 1-11).

Block 13300 of method 13000 comprises identifying via the scanning module, out of the wireless signals, first wireless packets of a first client of the registered customer et. For example, the first wireless packets of the first client can be similar to wireless packets 1311 of wireless client 1310, as illustrated above in FIG. 1 and as described with respect to transaction system 1000 (FIGS. 1-11).

Method 13000 also comprises block 13400 for calculating, via the scanning module, a first client signal strength of the first wireless packets. The first client signal strength can be similar to the RSS of one or more packets of wireless packets 1311 of wireless client 1310 (FIG. 1), as described with respect to transaction system 1000 (FIGS. 1-11).

Method 13000 further comprises block 13500 for calculating, via a localization module, whether the first client is at a transaction area of the business locale based on the first client signal strength. The localization module can be similar to localization module 2220 (FIG. 2) in some examples, and the calculation of whether the first client is at the transaction area of the business local can be similar to one or more of the different calculations by localization module 2220 with respect to determining whether wireless client 1310 and/or 1320 is located at transaction area 1910 of business locale 1900 (FIG. 1) as described with respect to transaction system 1000 (FIGS. 1-11).

Block 13600 of method 13000 comprises presenting a user interface to a user at the transaction area via a POS module, the user interface comprising a first payment option correlated to the first client when the localization module calculates that the first client is at the transaction area. The POS module and the user interface can be respectively similar to POS module 1100 and user interface 1110 (FIGS. 1, 2) in some embodiments, while the first payment option can be similar to transaction option 6511 (FIGS. 6, 9) correlated to wireless client 1310 (FIG. 1) as describes above with respect to transaction system 1000 (FIGS. 1-11).

In some examples, one or more of the different blocks of methods 12000 or 13000 can be combined into a single block or performed simultaneously, and/or the sequence of such blocks can be changed. For example, blocks 12100 and 12300 of method 12000 can be performed simultaneously, such as where the client ID module and the point of service module are comprised by a single unit. In the same or other examples, some of the blocks of methods 12000 or 13000 can be subdivided into several sub-blocks. For example, block 13500 of method 13000 can be subdivided into further sub-blocks, such as a sub-block for correlating the first client signal strength against the first signal strength chart generated by the training module of block 13100, such as described above with respect to the correlation of the RSS of wireless packets 1311 (FIG. 1) with the reference signal strengths 11150 of RSS chart 10000 (FIGS. 10-11). There can also be examples where methods 12000 or 13000 can comprise further or different blocks. As an example method 13000 can comprise an additional block for emitting a payment confirmation request to the first client when the first payment option is selected by the user, as described above with respect to payment confirmation request 7510 and payment authentication 7520 (FIG. 7). In addition, there may be examples where methods 12000 or 13000 can comprise only part of the steps described above. For instance, block 13100 can be optional in some implementations of method 13000. Other variations can be implemented for methods 12000 or 13000 without departing from the scope of the present disclosure.

Although the wireless client transaction systems related methods herein have been described with reference to specific embodiments, various changes may be made without departing from the spirit or scope of the present disclosure. For example, there can be situations where training module 2300 may not be available or where it may not be otherwise feasible to build a radio fingerprint such as described above with respect to RSS chart 10000 (FIGS. 10-11). As an alternative, localization module 2220 (FIG. 2) may rely on a direct comparison between the RSS of the wireless packets of the different wireless clients 1300 present at business locale 1900 (FIG. 1), and ascertain that the one with the greatest RSS is at or closest to transaction area 1910 as described above. As another alternative, localization module 2220 (FIG. 2) may predict RSS at various locations using an RF propagation model, such as the log-distance path loss model. Other model-based techniques can be used as well by localization module 2220 instead of RSS chart 10000 generated as described above by training module 2220, such as a ray-tracing model or a Bayesian hierarchical approach.

Several other examples of such possible changes have been given in the foregoing description. Other permutations of the different embodiments having one or more of the features of the various figures are likewise contemplated. Accordingly, the disclosure herein is intended to be illustrative of the scope of the invention and is not intended to be limiting. It is intended that the scope of this application shall be limited only to the extent required by the appended claims.

The wireless client transaction systems related methods discussed herein may be implemented in a variety of embodiments, and the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A system comprising:
a client ID module incorporated into a computing device comprising:
 a scanning module configured to:
  scan a wireless channel set at a business locale for wireless signals associated with client devices of a registered customer set;
  identify, out of the wireless signals, first wireless packets of a first client device of the registered customer set; and
  calculate a first client device signal strength of the first wireless packets; and
 a localization module configured to:
  calculate whether the first client device is at a transaction area of the business locale based on the first client device signal strength and without reliance on NFC technology.

2. The system of claim 1, further comprising:
a training module incorporated into the computing device configured to generate a first signal strength chart of a portion of the business locale for a first reference device type, wherein:
 the training module generates the first signal strength chart from first reference signal strengths calculated for first reference wireless packets of the first reference device type;
 the first reference wireless packets comprise:
  first nearby reference wireless packets associated with a client device of the first reference device type; and
  first distant reference wireless packets associated with the client device of the first reference device type;
 the first reference signal strengths comprise:
  a first nearby reference signal strength associated with the client device of the first reference device type, calculated from the first nearby reference wireless packets identified by the scanning module from a nearby reference location at the business locale; and
  a first distant reference signal strength associated with the client device of the first reference device type, calculated from the first distant reference wireless packets identified by the scanning module from a distant reference location at the business locale; and
 the nearby reference location is located closer to the scanning module than the distant reference location; and
the training module is configured to store the first signal strength chart; and
the localization module can access the first signal strength chart to determine the localization of client devices.

3. The system of claim 2, wherein the client device lacks any software or hardware incorporating NFC technology.

4. The system of claim 2, wherein a client identifier comprises at least one of a Media Access Control (MAC) and an Extended Unique Identifier (EUI) address.

5. The system of claim 2, wherein the computing device can be selected from a group comprising: a laptop computer, a notebook computer, a tablet computer, or any computing-directed devices with wireless functionality.

6. The system of claim 2, further comprising a Point of Service (POS) module presenting, to the transaction area, a user interface comprising a transaction option correlated to an owner of the client device.

7. The system of claim 6, further comprising:
the owner inputting financial account information belonging to them into the POS module;
the POS module projecting a request for a payment confirmation; and
the owner inputting a user password identifying them into the POS module.

8. The system of claim 7, further comprising:
the POS module confirming that the user password identifies the owner; and
the POS module billing the owner's bank account for an amount of money reflected on the payment confirmation.

9. The system of claim 2, wherein a client device is selected from a group comprising cellular phones, smartphones, and tablet devices.

10. The system of claim 5, wherein a form of data determined by the scanning module and obtained from the wireless packets can comprise a bitrate for wireless packets, a frequency channel for wireless packets, or a measurement of received signal strength (RSS) for wireless packets of client devices.

11. The system of claim 10, further comprising the localization module
comparing the data for multiple client devices at business locales; and
determining that the client device with a greater RSS is more likely to be located at the transaction area.

12. The system of claim 11, wherein
the system locates more than one client device in close proximity wherein
 the POS module presents a screen reflecting a transaction option for an owner of a client device to self-identify.

13. The system of claim 11, wherein aggregate statistics for data associated with the client device over a latest time period can comprise:
a signal strength mean;
a signal strength variance;
a signal strength median;
a signal strength quartile;
a number of frequency channels used for wireless packets throughout the latest time period; or
a number of wireless packets transmitted throughout the latest time period.

14. The system of claim 13, wherein the aggregate statistics are applied to generate RSS values that ascertain the location of the client devices.

15. The system of claim 11, wherein the training module constructs a RSS chart based on RSS measurement vectors that correlate to specific locations or specific conditions of corresponding wireless packets from a reference device type.

16. The system of claim 15, wherein the reference device type for which the RSS chart is built can relate to a specific type, brand, or model of wireless device.

* * * * *

UNITED STATES PATENT AND TRADEMARK OFFICE
CERTIFICATE OF CORRECTION

PATENT NO. : 11,403,616 B2
APPLICATION NO. : 16/920262
DATED : August 2, 2022
INVENTOR(S) : Pravin Shankar, Steven William Streit and Samuel Harris Altman It is certified that error appears in the above-identified patent and that said Letters Patent is hereby corrected as shown below:

In the Claims

Column 20 Claim 8, Line 15: replace "the owner's bank account" with --a bank account of the owner--; Claim 12, Line 38: replace "the POS" with --a POS--.

Signed and Sealed this
Eighteenth Day of October, 2022

Katherine Kelly Vidal
*Director of the United States Patent and Trademark Office*